(12) United States Patent
Horimai et al.

(10) Patent No.: US 7,227,827 B2
(45) Date of Patent: Jun. 5, 2007

(54) OPTICAL INFORMATION RECORDING APPARATUS, OPTICAL INFORMATION REPRODUCING APPARATUS, OPTICAL INFORMATION RECORDING/REPRODUCING APPARATUS, AND OPTICAL INFORMATION RECORDING MEDIUM

(75) Inventors: Hideyoshi Horimai, Kanagawa (JP); Mitsuteru Inoue, Aichi (JP); Toshitaka Fujii, Aichi (JP)

(73) Assignee: Optware Corporation, Yokohama-shi (JP)

( * ) Notice: Subject to any disclaimer, the term of this patent is extended or adjusted under 35 U.S.C. 154(b) by 943 days.

(21) Appl. No.: 10/220,745

(22) PCT Filed: Mar. 9, 2001

(86) PCT No.: PCT/JP01/01844

§ 371 (c)(1),
(2), (4) Date: Sep. 11, 2002

(87) PCT Pub. No.: WO01/69598
PCT Pub. Date: Sep. 20, 2001

(65) Prior Publication Data
US 2003/0095477 A1 May 22, 2003

(30) Foreign Application Priority Data
Mar. 13, 2000 (JP) .............................. 2000-067989

(51) Int. Cl.
*G11B 7/00* (2006.01)
(52) U.S. Cl. ................ 369/103; 369/112.1; 369/112.15
(58) Field of Classification Search ................ 369/103, 369/112.19, 112.17, 116, 110.01, 13.28, 112.1, 369/112.15; 359/24, 3, 11
See application file for complete search history.

(56) References Cited

U.S. PATENT DOCUMENTS
4,012,108 A * 3/1977 Ishii et al. ..................... 359/3
(Continued)

FOREIGN PATENT DOCUMENTS
JP  A-05-182266   7/1993
(Continued)

OTHER PUBLICATIONS

Heanue et al.; "Recall of linear combinations of stored data pages based on phase-code multiplexing in volume holography," Optics Letters, vol. 19, No. 14, Jul. 15, 1994, pp. 1079-1081.
(Continued)

*Primary Examiner*—Ali Neyzari
(74) *Attorney, Agent, or Firm*—Oliff & Berridge, PLC

(57) ABSTRACT

An object of the present invention is to make it possible to record information on an optical information recording medium in the form of three dimensional interference patterns so that the information is erasable in part.

The optical information recording medium (1) has an information recording layer (3) made of a magneto-optic recording material. A pick-up (11) of an optical information recording/reproducing apparatus generates information light by spatially modulating laser light emitted from a light source unit (20) with a spatial light modulator (22), and generates recording-specific reference light spatially modulated in phase by spatially modulating the phase of the laser light emitted from the light source (20) with a phase-spatial light modulator (16). The information recording layer (3) of the optical information recording medium (1) is irradiated with the information light and the recording-specific reference light. An electromagnetic coil (30) applies a magnetic field to the information recording layer (3). A three-dimensional distribution pattern of magnetization corresponding to the interference pattern resulting from the information light and the recording-specific reference light is formed in the information recording layer (3).

10 Claims, 12 Drawing Sheets

U.S. PATENT DOCUMENTS

| | | | |
|---|---|---|---|
| 5,319,629 A | * | 6/1994 | Henshaw et al. ........... 369/103 |
| 5,719,691 A | * | 2/1998 | Curtis et al. .................. 359/11 |
| 7,065,032 B2 | * | 6/2006 | Horimai ..................... 369/103 |

FOREIGN PATENT DOCUMENTS

| | | |
|---|---|---|
| JP | A-08-115541 | 5/1996 |
| JP | A-08-273228 | 10/1996 |
| JP | A-10-226539 | 8/1998 |
| JP | A-11-204334 | 7/1999 |

OTHER PUBLICATIONS

Heanue et al., "Encrypted holographic data storage based on orthogonal-phase-code multiplexing," Applied Optics, vol. 34, No. 26, Sep. 10, 1995, pp. 6012-6015.

Hara et al., "Direct synthesis of yttrium-ion garnet by mist pyrosis," Abstracts of 21$^{st}$ Academic Lectures, The Magnetic Society of Japan, p. 460, 1997 (with English-language translation—pp. 1-3).

O plus E, No. 202, pp. 93-99, Sep. 1996 (with partial English-language translation—pp. 1-3).

* cited by examiner

1

0

OPTICAL INFORMATION RECORDING APPARATUS, OPTICAL INFORMATION REPRODUCING APPARATUS, OPTICAL INFORMATION RECORDING/REPRODUCING APPARATUS, AND OPTICAL INFORMATION RECORDING MEDIUM

TECHNICAL FIELD

The present invention relates to an optical information recording apparatus for recording information on an optical information recording medium through the use of holography, an optical information reproducing apparatus for reproducing information from an optical information recording medium through the use of holography, an optical information recording/reproducing apparatus for recording information on an optical information recording medium and reproducing the information from the optical information recording medium through the use of holography, and an optical information recording medium on which information is recorded through the use of holography.

BACKGROUND ART

Holographic recording for recording information on a recording medium through the use of holography is typically performed by superimposing light that carries image information on reference light within the recording medium and by writing a resultingly generated interference pattern onto the recording medium. For reproducing the information recorded, the recording medium is irradiated with reference light so that the image information is reproduced through diffraction derived from the interference pattern.

Recently, volume holography, or digital volume holography in particular, has been developed and is attracting attention in practical fields for ultra-high density optical recording. Volume holography is a method for writing a three-dimensional interference pattern by making positive use of a recording medium in the direction of thickness as well, and is characterized in that an increase in thickness can enhance the diffraction efficiency and a greater recording capacity can be achieved by employing multiplex recording. Digital volume holography is a computer-oriented holographic recording method which uses the same recording medium and recording method as with the volume holography, whereas the image information to be recorded is limited to binary digital patterns. In the digital volume holography, analog image information such as a picture is once digitized and developed into two-dimensional digital pattern information, and then it is recorded as image information. For reproduction, this digital pattern information is read and decoded to restore the original image information for display. Consequently, even if the SN ratio (signal-to-noise ratio) in the reproduction is somewhat poor, differential detection and/or error correction on encoded binary data enable to reproduce the original information with extremely high fidelity.

In holographic recording through the use of volume holography, various methods of multiplex recording have been proposed to improve the recording density for achieving increased recording capacity. One of those methods is angular multiplexing that is to record information with angles of the reference light varied from information to be recorded. Another method is phase encoding multiplexing as described in 'Heanue, J. F., et al., "Recall of linear combinations of stored data pages based on phase-code multiplexing in volume holography", Optics Letters, Vol. 19, No. 14, pp. 1079-1081, 1994' and 'Heanue, J. F., et al., "Encrypted holographic data storage based on orthogonal-phase-code multiplexing" Applied Optics, Vol. 34, No. 26, pp. 6012-6015, 1995'.

For materials of a recording medium for holographic recording, generally used are materials whose optical characteristics such as refractive index, permittivity, and reflectivity change depending on intensity of light when irradiated with light. Therefore, to erase information recorded on the recording medium, it is necessary that the areas on which the information is recorded be uniformized in the optical characteristics.

In the case where the information is recorded on the recording medium by multiplex recording, however, according to an erasing method as described above, it is not possible to erase part of the information selectively, because is erased all of the information recorded on the areas that are thus uniformized in the optical characteristics.

Moreover, in conventional holographic recording, the changes in the optical characteristics of the recording medium are often nonreversible, which makes it difficult to rewrite information.

DISCLOSURE OF THE INVENTION

It is a first object of the invention to provide an optical information recording apparatus which can record information on an optical information recording medium in the form of three dimensional interference patterns so that the information is erasable in part.

It is a second object of the invention to provide an optical information reproducing apparatus which can reproduce information that is recorded on an optical information recording medium in the form of three dimensional interference patterns so that the information is erasable in part.

It is a third object of the invention to provide an optical information recording/reproducing apparatus which can record information on an optical information recording medium in the form of three dimensional interference patterns so that the information is erasable in part, and can reproduce the information.

It is a fourth object of the invention to provide an optical information recording medium on which information can be recorded in the form of three dimensional interference patterns so that the information is erasable in part.

An optical information recording apparatus of the invention is an apparatus for recording information on an optical information recording medium, the recording medium having an information recording layer made of a magneto-optic recording material, information being recorded in the information recording layer in the form of a distribution pattern of magnetization through the use of holography, the apparatus comprising:

information light generation means for generating information light that carries information;

recording-specific reference light generation means for generating recording-specific reference light;

a recording optical system for irradiating the information recording layer with the information light generated by the information light generation means and the recording-specific reference light generated by the recording-specific reference light generation means, so that a three-dimensional interference pattern resulting from interference between the information light and the recording-specific reference light is formed in the information recording layer; and magnetic field application means for applying, to the information recording layer, a magnetic field for changing the distribution pattern of magnetization in the information recording layer according to the interference pattern.

In the optical information recording apparatus of the invention, the information light generation means generates the information light, the recording-specific reference light generation means generates the recording-specific reference light, and the recording optical system irradiates the information recording layer with the information light and the recording-specific reference light, whereby a three-dimensional interference pattern resulting from the interference between the information light and the recording-specific reference light is formed in the information recording layer. Furthermore, the magnetic field application means applies a magnetic field to the information recording layer to change the distribution pattern of magnetization in the information recording layer according to the interference pattern, so that information is recorded in the form of the distribution pattern of magnetization.

In the optical information recording apparatus of the invention, the recording optical system may perform the irradiation with the information light and the recording-specific reference light so that an optical axis of the information light and an optical axis of the recording-specific reference light are located on the same line.

In the optical information recording apparatus of the invention, the optical information recording medium may have a positioning area on which information for positioning the information light and the recording-specific reference light is recorded, and position control means may be further provided for controlling positions of the information light and the recording-specific reference light with respect to the optical information recording medium by using the information recorded on the positioning area.

An optical information reproducing apparatus of the invention is an apparatus for reproducing information from an optical information recording medium, the recording medium having an information recording layer made of a magneto-optic recording material, the information being recorded in the information recording layer in the form of a distribution pattern of magnetization through the use of holography, the apparatus comprising:

reproduction-specific reference light generation means for generating reproduction-specific reference light;

a reproducing optical system for irradiating the information recording layer with the reproduction-specific reference light generated by the reproduction-specific reference light generation means, and for collecting reproduction light generated from the information recording layer irradiated with the reproduction-specific reference light; and detection means for detecting the reproduction light collected by the reproducing optical system.

In the optical information reproducing apparatus of the invention, the reproduction-specific reference light generation means generates the reproduction-specific reference light, the reproducing optical system irradiates the information recording layer with the reproduction-specific reference light and collects the reproduction light generated from the information recording layer, and the detection means detects the reproduction light, to reproduce the information.

In the optical information reproducing apparatus of the invention, the reproducing optical system may perform the irradiation with the reproduction-specific reference light and the collection of the reproduction light so that an optical axis of the reproduction-specific reference light and an optical axis of the reproduction light are located on the same line.

In the optical information reproducing apparatus of the invention, the optical information recording medium may have a positioning area on which information for positioning the reproduction-specific reference light is recorded, and position control means may be further provided for controlling a position of the reproduction-specific reference light with respect to the optical information recording medium by using the information recorded on the positioning area.

An optical information recording/reproducing apparatus of the invention is an apparatus for recording information on an optical information recording medium and reproducing the information from the optical information recording medium, the recording medium having an information recording layer made of a magneto-optic recording material, the information being recorded in the information recording layer in the form of a distribution pattern of magnetization through the use of holography, the apparatus comprising:

information light generation means for generating information light that carries information;

recording-specific reference light generation means for generating recording-specific reference light;

reproduction-specific reference light generation means for generating reproduction-specific reference light;

a recording/reproducing optical system for irradiating the information recording layer with the information light generated by the information light generation means and the recording-specific reference light generated by the recording-specific reference light generation means so that a three-dimensional interference pattern resulting from interference between the information light and the recording-specific reference light is formed in the information recording layer, and for irradiating the information recording layer with the reproduction-specific reference light generated by the reproduction-specific reference light generation means and collecting reproduction light generated from the information recording layer;

magnetic field application means for applying, to the information recording layer, a magnetic field for changing the distribution pattern of magnetization in the information recording layer according to the interference pattern; and detection means for detecting the reproduction light collected by the recording/reproducing optical system.

In the optical information recording/reproducing apparatus of the invention, for recording information, the information light generation means generates the information light, the recording-specific reference light generation means generates the recording-specific reference light, and the recording/reproducing optical system irradiates the information recording layer with the information light and the recording-specific reference light, whereby a three-dimensional interference pattern resulting from the interference between the information light and the recording-specific reference light is formed in the information recording layer. Furthermore, the magnetic field application means applies a magnetic field to the information recording layer to change the distribution pattern of magnetization in the information recording layer according to the interference pattern, so that information is recorded in the form of the distribution pattern of magnetization. On the other hand, for reproducing information, the reproduction-specific reference light generation means generates the reproduction-specific reference light, the recording/reproducing optical system irradiates the information recording layer with the reproduction-specific reference light and collects the reproduction light generated from the information recording layer, and the detection means detects the reproduction light, to reproduce the information.

In the optical information recording/reproducing apparatus of the invention, the recording/reproducing optical system may perform the irradiation with the information light and the recording-specific reference light so that an optical axis of the information light and an optical axis of the recording-specific reference light are located on the same line, and may perform the irradiation with the reproduction-specific reference light and the collection of the reproduction light so that an optical axis of the reproduction-specific reference light and an optical axis of the reproduction light are located on the same line.

In the optical information recording/reproducing apparatus of the invention, the optical information recording medium may have a positioning area on which information for positioning the information light, the recording-specific reference light and the reproduction-specific reference light is recorded, and position control means may be further provided for controlling positions of the information light, the recording-specific reference light and the reproduction-specific reference light with respect to the optical information recording medium by using the information recorded on the positioning area.

The optical information recording/reproducing apparatus of the invention may further comprise erasure means for erasing information by making the detection means detect reproduction light corresponding to information to be erased, reproducing the information based on the reproduction light, making the information light generation means generate erasure-specific information light that carries the reproduced information, making the recording-specific reference light generation means generate recording-specific reference light, irradiating the information recording layer with the erasure-specific information light and the recording-specific reference light, and by making the magnetic field application means apply to the information recording layer a magnetic field in a direction opposite to that for recording.

An optical information recording medium of the invention comprises an information recording layer made of a magneto-optic recording material, information being recorded in the information recording layer in the form of a distribution pattern of magnetization, the distribution pattern of magnetization being changed according to an interference pattern resulting from interference between information light and recording-specific reference light and a magnetic field applied thereto.

On the optical information recording medium of the invention, information is recorded in the form of a distribution pattern of magnetization, the distribution pattern of magnetization changing according to the interference pattern resulting from the interference between the information light and the recording-specific reference light and the magnetic field applied thereto.

The optical information recording medium of the invention may further comprise a positioning area on which information for positioning incident light is recorded.

In the optical information recording medium of the invention, the information recording layer may be made of a granular film, a magnetic film formed by laminating magnetic particles prepared by mist pyrolysis, a magnetic film having pinning sites, or a magnetic photonic crystal.

The optical information recording medium of the invention may further comprise a reflection film provided on a side of the information recording layer opposite to a light-incidence side of the information recording layer. In this case, the reflection film may be made of a dielectric multi-layer film that restrains reflected light from becoming elliptically polarized light when linearly polarized light is incident thereon.

Other objects, features and advantages of the invention will become sufficiently clear from the following description.

BEST MODE FOR CARRYING OUT THE INVENTION

Embodiments of the present invention will now be described in detail with reference to the drawings.

FIRST EMBODIMENT

Figure 1:
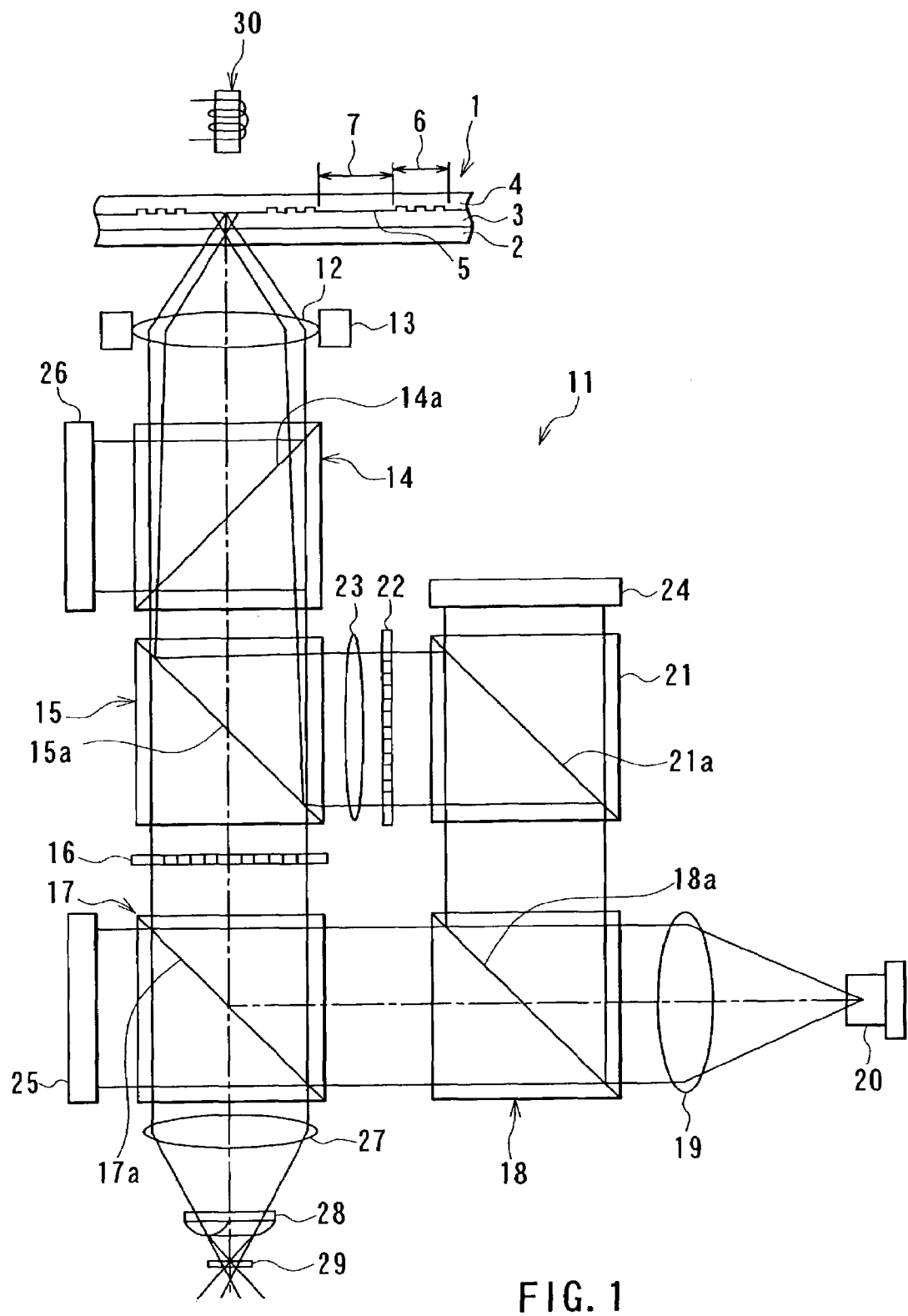
FIG. 1 is an explanatory diagram showing a configuration of an optical information recording/reproducing apparatus and an optical information recording medium according to a first embodiment of the invention.
Figure 2:
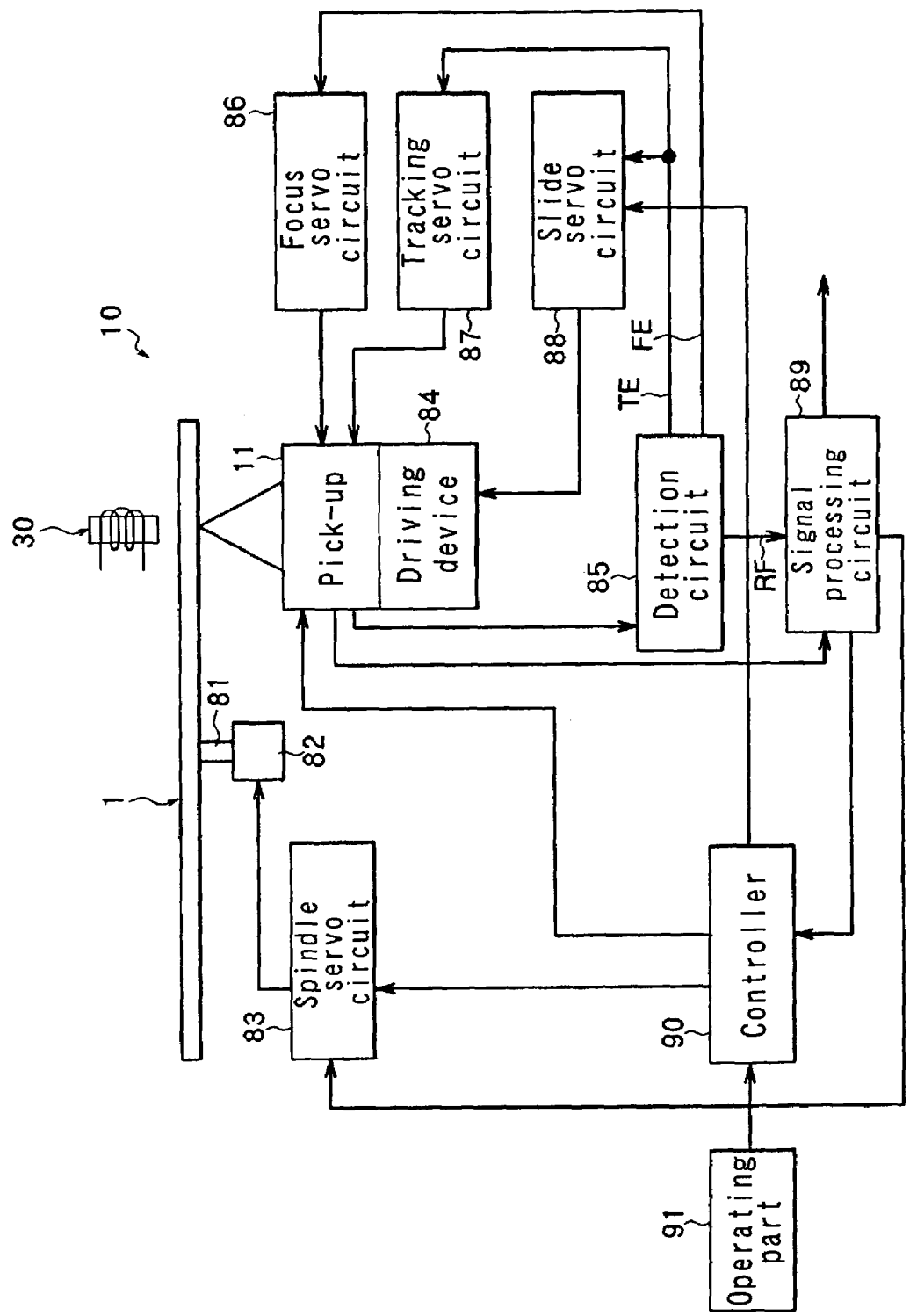
FIG. 2 is a block diagram showing a general configuration of the optical information recording/reproducing apparatus according to the first embodiment of the invention.

FIG. 1 is an explanatory diagram showing a configuration of an optical information recording/reproducing apparatus and an optical information recording medium according to a first embodiment of the invention. FIG. 2 is a block diagram showing a general configuration of the optical information recording/reproducing apparatus according to this embodiment.

Reference is now made to FIG. 1 to describe the configuration of the optical information recording medium according to this embodiment. The optical information recording medium 1 is made up of an information recording layer 3 on which information is recorded through the use of volume holography, a reflection film 5, and a protection layer 4 that are stacked in this order on one surface of a disk-like transparent substrate 2 made of polycarbonate or the like. A plurality of address servo areas 6 serving as positioning areas extending linearly in radial directions are provided at predetermined angular intervals on the interface between the information recording layer 3 and the protection layer 4. Sections in the form of sectors between adjacent ones of the address servo areas 6 are provided as data areas 7. On the address servo areas 6, information for performing focus servo and tracking servo under a sampled servo system and address information are recorded in advance in the form of emboss pits or the like. The focus servo can be performed by using a reflecting surface of the reflection film 5. For example, wobble pits may be used as the information for performing tracking servo. The transparent substrate 2 has an appropriate thickness of 0.6 mm or less, for example. The information recording layer 3 has an appropriate thickness of 10 μm or more, for example. The information recording layer 3 is made of a magneto-optic recording material, on which information is recorded in the form of distribution patterns of magnetization through the use of holography. The reflection film 5 is made of aluminum or a dielectric multilayer film, for example.

It is known that in dielectric multilayer films the ellipticity of reflected light varies, when linearly polarized light is incident thereon, depending on the refractive indexes and thicknesses of the individual films. Hence, if the reflection film 5 is formed using a dielectric multilayer film, it is preferable to set the refractive indexes and thicknesses of the individual films so as to decrease the ellipticity of the reflected light when linearly polarized light is incident on the reflection film 5. This can restrain the reflected light from becoming elliptically polarized light when linearly polarized light is incident on the reflection film 5, and make the reflected light linearly polarized light or almost linearly polarized light. As a result, it is possible to improve S/N ratio in reproducing information.

Reference is now made to FIG. 2 to describe the configuration of the optical information recording/reproducing apparatus of this embodiment. The optical information recording/reproducing apparatus 10 comprises: a spindle 81 on which the optical information recording medium 1 is mounted; a spindle motor 82 for rotating the spindle 81; and a spindle servo circuit 83 for controlling the spindle motor 82 so that the rotating speed of the optical information recording medium 1 is kept at a predetermined value. The optical information recording/reproducing apparatus 10 further comprises: a pick-up 11 for irradiating the optical information recording medium 1 with information light and recording-specific reference light to record information, and irradiating the optical information recording medium 1 with reproduction-specific reference light and detecting reproduction light to reproduce the information recorded on the optical information recording medium 1; an electromagnetic coil 30 located to oppose to the pick-up 11 with the optical information recording medium 1 in between; and a driving device 84 for allowing the pick-up 11 and the electromagnetic coil 30 to be integrally movable in the direction of the radius of the optical information recording medium 1. The electromagnetic coil 30 corresponds to the magnetic field application means of the invention.

The optical information recording/reproducing apparatus 10 further comprises: a detection circuit 85 for detecting a focus error signal FE, a tracking error signal TE, and a reproduction signal RF from an output signal of the pick-up 11; a focus servo circuit 86 for performing focus servo by driving an actuator in the pick-up 11 based on the focus error signal FE detected by the detection circuit 85 to move an objective lens in the direction of the thickness of the optical information recording medium 1; a tracking servo circuit 87 for performing tracking servo by driving the actuator in the pick-up 11 based on the tracking error signal TE detected by the detection circuit 85 to move the objective lens in the direction of the radius of the optical information recording medium 1; and a slide servo circuit 88 for performing slide servo by controlling the driving device 84 based on the tracking error signal TE and a command from a controller to be described later to move the pick-up 11 in the direction of the radius of the optical information recording medium 1.

The optical information recording/reproducing apparatus 10 further comprises: a signal processing circuit 89 for decoding the output data of a CCD array of the pick-up 11 to be described later to reproduce data recorded in the data areas 7 of the optical information recording medium 1, and for reproducing a basic clock and determining addresses from the reproduction signal RF from the detection circuit 85; a controller 90 for controlling the optical information recording/reproducing apparatus 10 as a whole; and an operating part 91 for giving various instructions to the controller 90. The controller 90 receives input of the basic clock and address information outputted from the signal processing circuit 89, and controls the pick-up 11, the spindle servo circuit 83, the slide servo circuit 88, and so on. The spindle servo circuit 83 receives input of the basic clock outputted from the signal processing circuit 89. The controller 90 has a CPU (Central Processing Unit), a ROM (Read Only Memory), and a RAM (Random Access Memory). Using the RAM as a work area, the CPU executes programs stored in the ROM to implement the functions of the controller 90.

The detection circuit 85, the focus servo circuit 86, the tracking servo circuit 87 and the slide servo circuit 88 correspond to the position control means of the present invention.

Next, the configuration of the pick-up 11 in this embodiment will be described with reference to FIG. 1. The pick-up 11 includes: an objective lens 12 which faces toward the transparent substrate 2 of the optical information recording medium 1 when the optical information recording medium 1 is fixed to the spindle 81; an actuator 13 capable of moving the objective lens 12 in the directions of the thickness and the radius of the optical information recording medium 1; and a polarization beam splitter 14, a beam splitter 15, a phase-spatial light modulator 16, and a beam splitter 17 arranged in this order from the objective lens 12, on the side of the objective lens 12 opposite to the optical information recording medium 1. The polarization beam splitter 14 has a polarization beam splitter surface 14a. The beam splitter 15 has a semi-reflecting surface 15a. The beam splitter 17 has a semi-reflecting surface 17a. The normal direction of each of the polarization beam splitter surface 14a, the semi-reflecting surface 15a and the semi-reflecting surface 17a is inclined at 45° with respect to the direction of the optical axis of the objective lens 12. The polarization beam splitter surface 14a and the semi-reflecting surface 15a are arranged to be orthogonal to each other; the semi-reflecting surface 15a and the semi-reflecting surface 17a are arranged to be parallel to each other.

The phase-spatial light modulator 16 has a number of pixels arranged in a matrix, and is capable of spatially modulating the phase of light by selecting the phase of outgoing light pixel by pixel. A liquid crystal element may be used as the phase-spatial light modulator 16.

The pick-up 11 further includes a beam splitter 18, a collimator lens 19, and a light source unit 20 that are arranged beside the beam splitter 17 in this order from the beam splitter 17. The beam splitter 18 has a semi-reflecting surface 18a whose normal direction is inclined at 45° with respect to the direction of the optical axis of the collimator lens 19. The light source unit 20 is provided for emitting coherent linearly-polarized light, and may be a semiconductor laser, for example. In the following description, the light source unit 20 shall emit P-polarized light.

The pick-up 11 further includes a beam splitter 21 that is provided in the direction in which the light from the light source unit 20 is reflected by the semi-reflecting surface 18a of the beam splitter 18. The beam splitter 21 has a semi-reflecting surface 21a that is arranged in parallel with the semi-reflecting surface 18a of the beam splitter 18. The beam splitter 21 is located beside the beam splitter 15, with the semi-reflecting surface 21a of the beam splitter 21 in parallel with the semi-reflecting surface 15a of the beam splitter 15.

The pick-up 11 further includes, between the beam splitter 21 and the beam splitter 15, a spatial light modulator 22 and a convex lens 23 that are arranged in this order from the beam splitter 21.

The spatial light modulator 22 has a number of pixels arranged in a matrix, and is capable of spatially modulating light with light intensity by selecting a light-transmitting state or a light-blocking state pixel by pixel, thereby generating information light that carries information. A liquid crystal element may be used as the spatial light modulator 22. The spatial light modulator 22 constitutes the information light generation means of the invention.

The pick-up 11 further includes: a photodetector 24 that is provided in the direction in which the light from the light source unit 20 is transmitted through the semi-reflecting surface 21a of the beam splitter 21; a photodetector 25 that is provided in the direction in which the light from the light source unit 20 is transmitted through the semi-reflecting surface 17a of the beam splitter 17; and a CCD array 26 serving as detection means, provided in the direction in which return light from the optical information recording medium 1 is reflected by the polarization beam splitter surface 14a of the polarization beam splitter 14. The photodetector 24 receives the light from the light source unit 20 that is reflected by the semi-reflecting surface 18a of the beam splitter 18, and the output is used for automatic adjustment of the intensity of the information light. The photodetector 25 receives the light from the light source unit 20 that is transmitted through the semi-reflecting surface 18a of the beam splitter 18, and the output is used for automatic adjustment of the intensity of reference light.

The pick-up 11 further includes a convex lens 27, a cylindrical lens 28, and a four-way split photodetector 29 that are arranged in this order from the beam splitter 17, in the direction in which the return light from the optical information recording medium 1 is transmitted through the semi-reflecting surface 17a of the beam splitter 17. The output signal of the four-way split photodetector 29 is inputted to the detection circuit 85 shown in FIG. 2. Based on the output signal of the four-way split photodetector 29, the detection circuit 85 detects the focus error signal FE, the tracking error signal TE, and the reproduction signal RF.

The phase-spatial light modulator 16, the spatial light modulator 22, and the light source unit 20 in the pick-up 11 are controlled by the controller 90 shown in FIG. 2. The controller 90 holds information on a plurality of modulation patterns intended for spatially modulating the phase of light with the phase-spatial light modulator 16. The operating part 91 is capable of selecting an arbitrary modulation pattern from among the plurality of modulation patterns. Then, the controller 90 supplies the phase-spatial light modulator 16 with the information on a modulation pattern selected by itself according to predetermined conditions or a modulation pattern selected by the operating part 91. According to the information on the modulation pattern supplied by the controller 90, the phase-spatial light modulator 16 spatially modulates the phase of light with the corresponding modulation pattern.

The reflectivity for each of the semi-reflecting surfaces 15a, 17a, 18a, and 21a in the pick-up 11 is set as appropriate so that, for example, the information light and the recording-specific reference light incident on the optical information recording medium 1 become identical in intensity.

Reference is now made to FIGS. 3A through 3C and FIG. 4 to describe the principle of magnetic holography utilized in this embodiment. Magnetic holography is information recording technology that combines the characteristics of magneto-optic recording and holography. More specifically, in magnetic holography, information is recorded by forming distribution patterns of magnetization corresponding to holography-based interference patterns in an information recording layer made of a magneto-optic recording material.

Figure 3A:
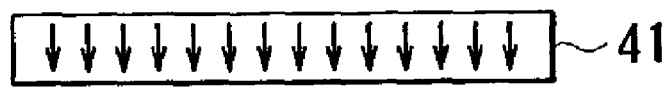
FIGS. 3A through 3C are explanatory diagrams illustrating the principle of magneto-optic recording to be used in magnetic holography.
Figure 3B:
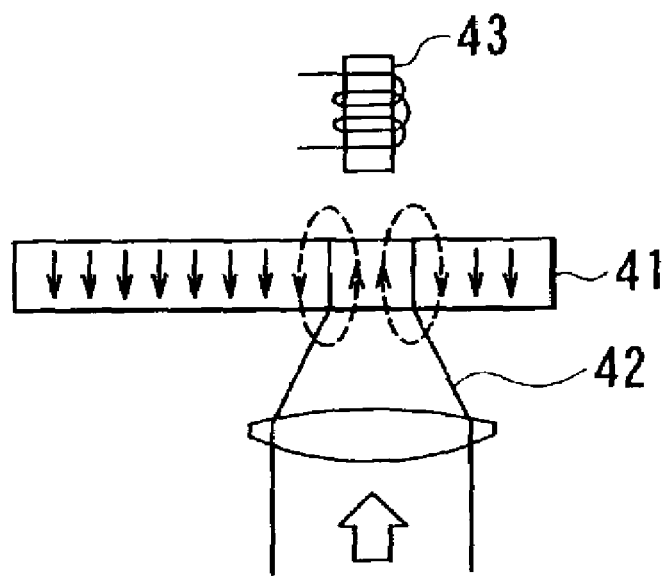
Figure 3C:
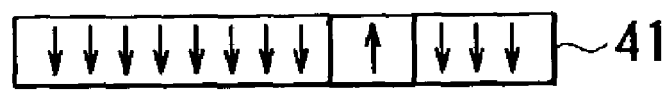

First, the principle of magneto-optic recording used in magnetic holography will be described with reference to FIGS. 3A through 3C. FIG. 3A shows an information recording layer 41 made of a magneto-optic recording material. The arrows in the information recording layer 41 indicate directions of magnetization. In FIG. 3A, the directions of magnetization in the information recording layer 41 are all downward. To record information on the information recording layer 41, the information recording layer 41 is irradiated with laser light 42 at a desired portion as shown in FIG. 3B, and an external magnetic field in the direction opposite to the directions of magnetization shown in FIG. 3A is applied by an electromagnetic coil 43. In the information recording layer 41, the portion irradiated with the laser light 42 reaches or exceeds Curie point in temperature, and the magnetization disappears. As shown in FIG. 3C, when the irradiation with the laser light 42 is ended, the temperature in the portion having been irradiated with the laser light 42 falls to or below Curie point, and magnetization is fixed in the same direction as that of the external magnetic field. In this way, in magneto-optic recording, the information recording layer 41 is selectively irradiated with light to form a distribution pattern of magnetization to thereby record information. The information recorded on the information recording layer 41 is reproduced through the use of a magneto-optic effect, i.e., Kerr effect or Faraday effect.

In magnetic holography, instead of selectively irradiating the information recording layer 41 with the laser light 42, a holography-based interference pattern is formed in the information recording layer 41. In this case, the information recording layer 41 rises in temperature at portions of the interference pattern where the light intensity is higher. Consequently, a distribution pattern of magnetization corresponding to the interference pattern is formed in the information recording layer 41.

Figure 4:
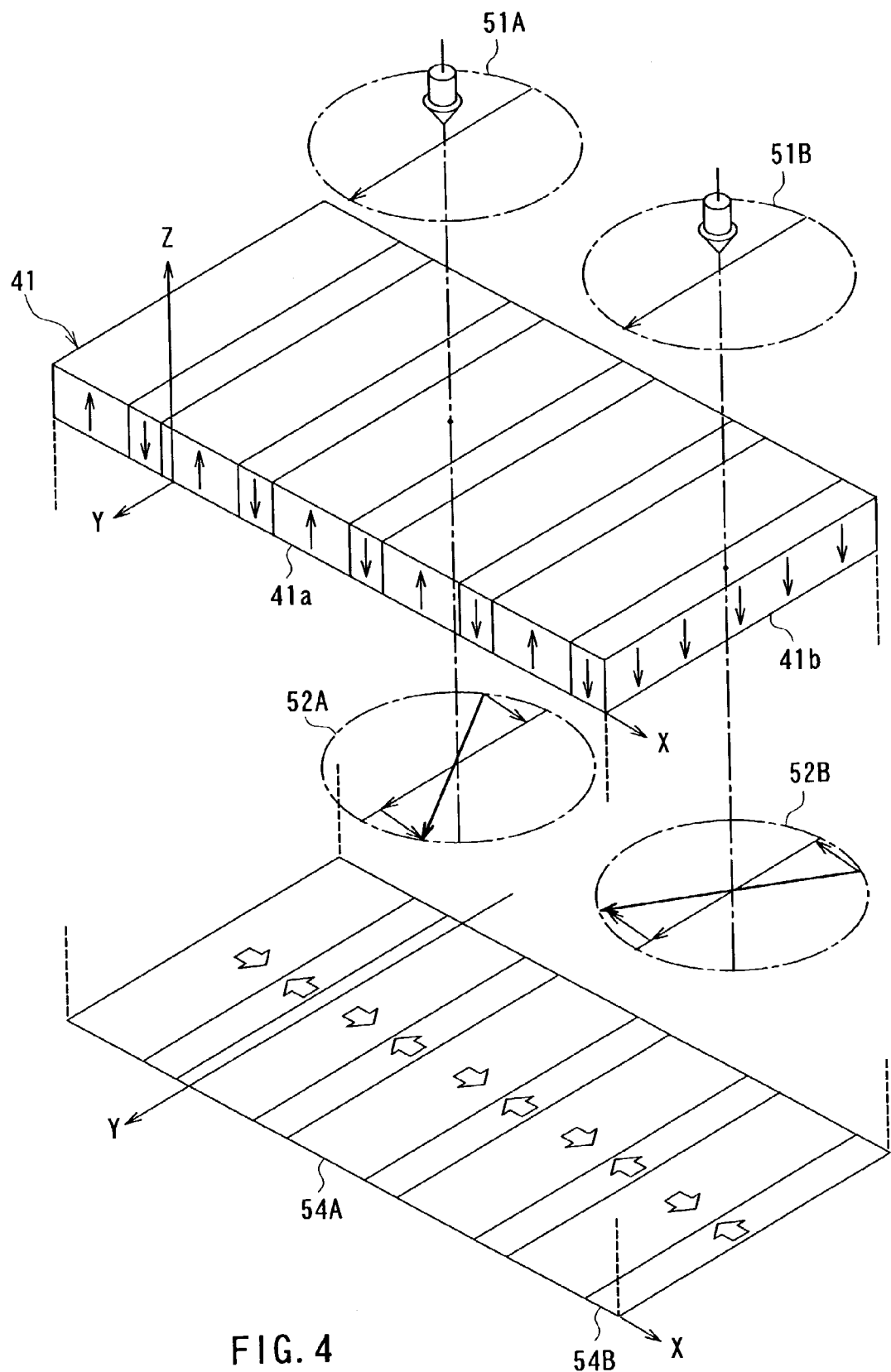
FIG. 4 is an explanatory diagram illustrating the principle of reproduction of information in magnetic holography.

Next, the principle of reproduction of information in magnetic holography will be described with reference to FIG. 4. In FIG. 4, the information recording layer 41 has a distribution pattern of magnetization in which two types of band-shaped portions 41a and 41b that are opposite in direction of magnetization are arranged alternately. In FIG. 4, the direction in which the band-shaped portions 41a and 41b are arranged is defined as X direction; the direction along the lengths of the band-shaped portions 41a and 41b is defined as Y direction; and the direction orthogonal to the X and Y directions is defined as Z direction.

It is here assumed that light linearly polarized in the Y direction is incident on the information recording layer 41. In FIG. 4, the reference numerals 51A and 51B represent beams of the light incident on the band-shaped portions 41a and 41b, respectively. The arrows inside the ellipses drawn with alternate long and short dashed lines represent the directions of polarization. The directions of polarization of the beams of light 52A and 52B having passed through the band-shaped portions 41a and 41b are rotated by a predetermined angle in directions opposite to each other due to Faraday effect. Consequently, the beams of light 52A and 52B bear Y-directional polarized components of the same magnitude and X-directional polarized components in opposite directions. In FIG. 4, the reference numeral 54A indicates part of the beams of light just having passed through the information recording layer 41, the part having a positive X-directional polarized component. The reference numeral 54B indicates another part of the beams of light just having passed through the information recording layer 41, the part having a negative X-directional polarized component.

Of the light having passed through the information recording layer 41, zeroth order diffracted light exhibits the Y-directional polarized component alone. On the other hand, first order diffracted light of the light having passed through the information recording layer 41 exhibits the X-directional polarized component alone. Therefore, of the light having passed through the information recording layer 41, that consisting of the X-directional polarized components is the light diffracted by the distribution pattern of magnetization, i.e., holography-based interference pattern, of the information recording layer 41. The light serves as reproduction light that carries the information recorded on the information recording layer 41. Thus, in the magnetic holography, information can be reproduced by detecting light having polarized components in the direction orthogonal to the direction of polarization of the light incident on the information recording layer 41.

In FIG. 4, the distribution pattern of magnetization of the information recording layer 41 is a two-dimensional one. In this embodiment, however, three-dimensional distribution patterns of magnetization are formed in the information recording layer 3 of the optical information recording medium 1 shown in FIG. 1. It is thereby possible to enhance the diffraction efficiency of the distribution patterns of magnetization and to attain increased recording capacity through multiplex recording.

Figure 5A:
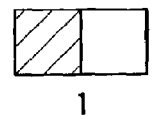
FIGS. 5A and 5B are explanatory diagrams showing how information is expressed in the first embodiment of the invention.
Figure 5B:
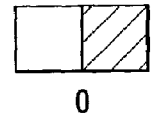

Reference is now made to FIGS. 5A and 5B to describe how information is expressed in this embodiment. In this embodiment, intensity (amplitude) of light is spatially modulated by the spatial light modulator 22 to generate information light that carries information. In this embodiment, adjoining two pixels express single-bit digital data of "1" or "0". More specifically, as shown in FIG. 5A, one of the two pixels is darkened and the other is brightened to express digital data "1", and, as shown in FIG. 5B, the dark and bright are inverted to express digital data "0". Two pixels both brightened or both darkened means error data.

Next, description will be given of the functions of the optical information recording/reproducing apparatus 10 according to the embodiment under servo, recording, reproducing, and erasing operations, individually. Here, directions of magnetization in the information recording layer 3 of the optical information recording medium 1 shall be all identical initially.

First, the function under servo operation will be described with reference to FIG. 1. Under servo operation, all the pixels of the spatial light modulator 22 are brought into a blocking state, and the phase-spatial light modulator 16 makes the phases of outgoing light all identical. The power of light emitted from the light source unit 20 is set to a low level for reproduction. The controller 90 predicts the timing at which the light that has exited from the objective lens 12 passes through the address servo areas 6 based on the basic clock reproduced from the reproduction signal RF, and maintains the foregoing setting while the light from the objective lens 12 passes through the address servo areas 6.

The light emitted from the light source unit 20 is collimated by the collimator lens 19 and incident on the beam splitter 18. The semi-reflecting surface 18a transmits a part of the light in terms of light quantity, and reflects the other part of the light. The light transmitted through the semi-reflecting surface 18a is incident on the beam splitter 17. The semi-reflecting surface 17a transmits a part of the light in terms of light quantity, and reflects the other part of the light. The light transmitted through the semi-reflecting surface 17a is received by the photodetector 25. The light reflected by the semi-reflecting surface 17a passes through the phase-spatial light modulator 16, and, a part of the light in terms of light quantity is transmitted through the semi-reflecting surface 15a of the beam splitter 15 and the polarization beam splitter surface 14a of the polorization beam splitter 14 in succession, condensed by the objective lens 12, and projected onto the optical information recording medium 1 so that it converges on the interface between the information recording layer 3 and the protection layer 4 of the optical information recording medium 1. This light is reflected by the reflection film 5 of the optical information recording medium 1. In this case, the reflected light is modulated by the emboss pits in the address servo areas 6, and then returns to the objective lens 12.

The return light from the optical information recording medium 1 is collimated by the objective lens 12, and part of the light in terms of light quantity passes through the polarization beam splitter surface 14a of the polarization beam splitter 14, the semi-reflecting surface 15a of the beam splitter 15, the phase-spatial light modulator 16, and the semi-reflecting surface 17a of the beam splitter 17 in succession. This light further passes through the convex lens 27 and the cylindrical lens 28 in succession, and then detected by the four-way split photodetector 29. Then, based on the output of this four-way split photodetector 29, the focus error signal FE, the tracking error signal TE, and the reproduction signal RF are generated. Based on these signals, focus servo and tracking servo are performed, along with reproduction of the basic clock and the determination of addresses.

In the foregoing setting under the servo operation, the configuration of the pick-up 11 is similar to that of pick-ups intended for recording and reproduction with ordinary optical disks such as a CD (compact disk), a DVD (digital video disk or digital versatile disk), and an HS (hyper storage disk). It is therefore possible to configure the optical information recording/reproducing apparatus 10 of this embodiment to have compatibility with ordinary optical disk devices.

Next, the function under recording operation will be described with reference to FIG. 1, FIG. 6, and FIG. 7. Under recording operation, the spatial light modulator 22 spatially modulates light passing therethrough by selecting a transmitting state (hereinafter, also referred to as ON) or a blocking state (hereinafter, also referred to as OFF) pixel by pixel according to information to be recorded, thereby generating information light. In addition, the electromagnetic coil 30 applies to the information recording layer 3 of the optical information recording medium 1 an external magnetic field in the direction opposite to the initial direction of magnetization of the information recording layer 3.

Moreover, the phase-spatial light modulator 16 spatially modulates the phase of light passing therethrough by selectively giving the light a phase difference of either 0 (rad) or π (rad) with reference to a predetermined phase pixel by pixel according to a predetermined modulation pattern, thereby generating recording-specific reference light having a spatially modulated phase. The controller 90 supplies the phase-spatial light modulator 16 with the information on the modulation pattern selected by itself according to predetermined conditions or the modulation pattern selected by the operating part 91. According to the information on the modulation pattern supplied from the controller 90, the phase-spatial light modulator 16 spatially modulates the phase of the light passing therethrough.

The power of light emitted from the light source unit 20 is set to reach high levels on a pulse basis for recording. The controller 90 predicts the timing at which the light that has exited from the objective lens 12 passes through the data areas 7 based on the basic clock reproduced from the reproduction signal RF, and maintains the foregoing setting while the light from the objective lens 12 passes through the data areas 7. While the light from the objective lens 12 passes through the data areas 7, neither focus servo nor tracking servo is performed and the objective lens 12 is fixed.

The light emitted from the light source unit 20 is collimated by the collimator lens 19 and incident on the beam splitter 18. The semi-reflecting surface 18a transmits a part of the light in terms of light quantity, and reflects the other part of the light. The light transmitted through the semi-reflecting surface 18a is incident on the beam splitter 17. The semi-reflecting surface 17a transmits a part of the light in terms of light quantity, and reflects the other part of the light. The light transmitted through the semi-reflecting surface 17a is received by the photodetector 25. The light reflected by the semi-reflecting surface 17a passes through the phase-spatial light modulator 16. In this case, the reflected light is spatially modulated in phase according to the predetermined modulation pattern and becomes the recording-specific reference light. Part of the recording-specific reference light in terms of light quantity is transmitted through the semi-reflecting surface 15a of the beam splitter 15 and the polarization beam splitter surface 14a of the polarization beam splitter 14 in succession, condensed by the objective lens 12, and projected onto the optical information recording medium 1 so that it converges on the interface between the information recording layer 3 and the protection layer 4 of the optical information recording medium 1.

Meanwhile, the light that has been emitted from the light source unit 20 and reflected by the semi-reflecting surface 18a of the beam splitter 18 is incident on the beam splitter 21. The semi-reflecting surface 21a transmits a part of the light in terms of light quantity, and reflects the other part of the light. The light transmitted through the semi-reflecting surface 21a is received by the photodetector 24. The light reflected by the semi-reflecting surface 21a passes through the spatial light modulator 22. In this case, the reflected light is spatially modulated in phase according to the information to be recorded and becomes the information light. The information light passes through the convex lens 23 to become converging light. Part of the information light in terms of light quantity is reflected by the semi-reflecting surface 15a of the beam splitter 15, is condensed by the objective lens 12 and projected onto the information recording medium 1. Then, the light once converges to a minimum diameter in front of the interface between the information recording layer 3 and the protection layer 4, and diverges while passing through the information recording layer 3.

Figure 6:
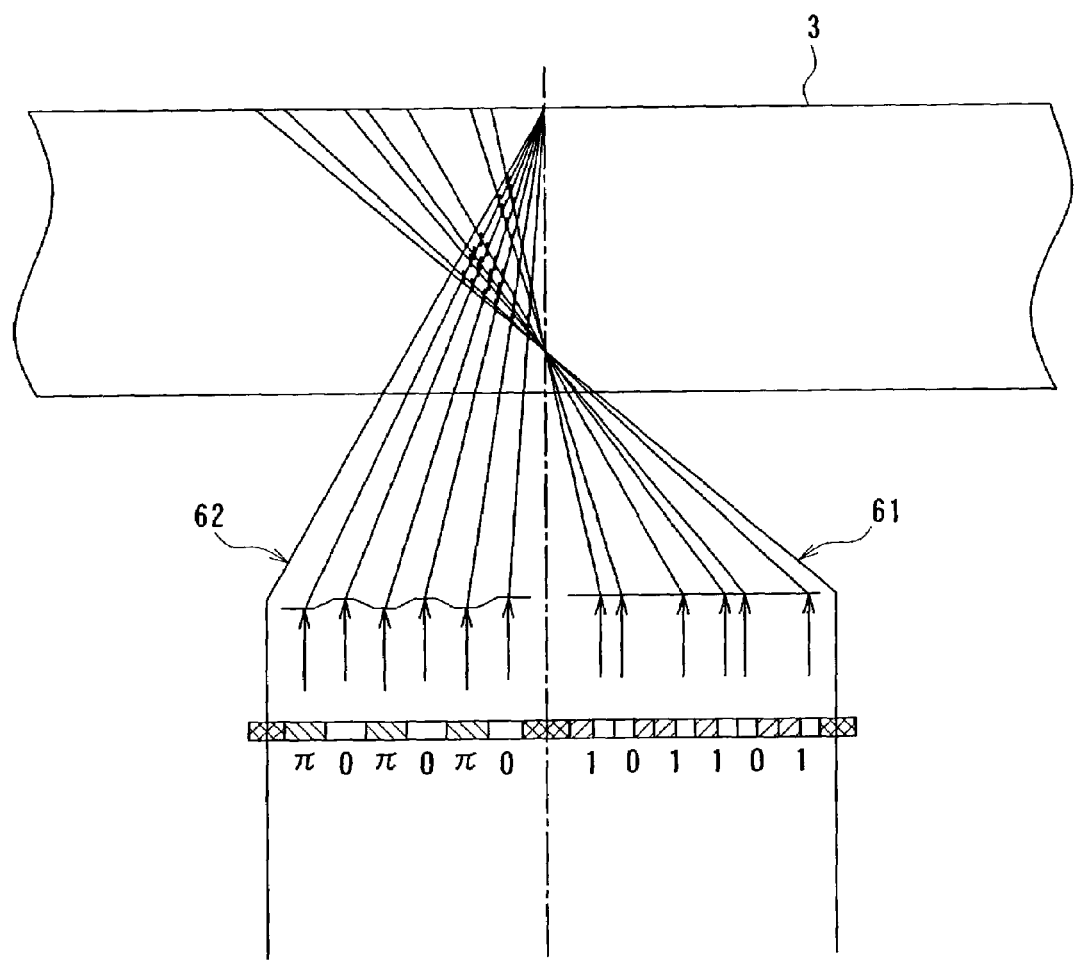
FIG. 6 is an explanatory diagram showing the state of light under recording in the first embodiment of the invention.

FIG. 6 is an explanatory diagram showing the state of light in the vicinity of the information recording layer 3 under recording operation. As shown in FIG. 6, in this embodiment, the information recording layer 3 is irradiated with the information light 61 and the recording-specific reference light 62 from the same side so that the optical axis of the information light 61 and the optical axis of the recording-specific reference light 62 are located on the same line. In the information recording layer 3, the information light 61 and the recording-specific reference light 62 interfere with each other to form a three-dimensional interference pattern. Then, when the power of the light emitted from the light source unit 20 reaches a high level, the information recording layer 3 rises in temperature at portions where the light intensity is higher. Subsequent to that, when the temperature at the portions drops following a shift of the irradiation target portion, the directions of magnetization are inverted. As a result, a three-dimensional distribution pattern of magnetization corresponding to the interference pattern between the information light 61 and the recording-specific reference light 62 is formed in the information recording layer 3.

Figure 7:
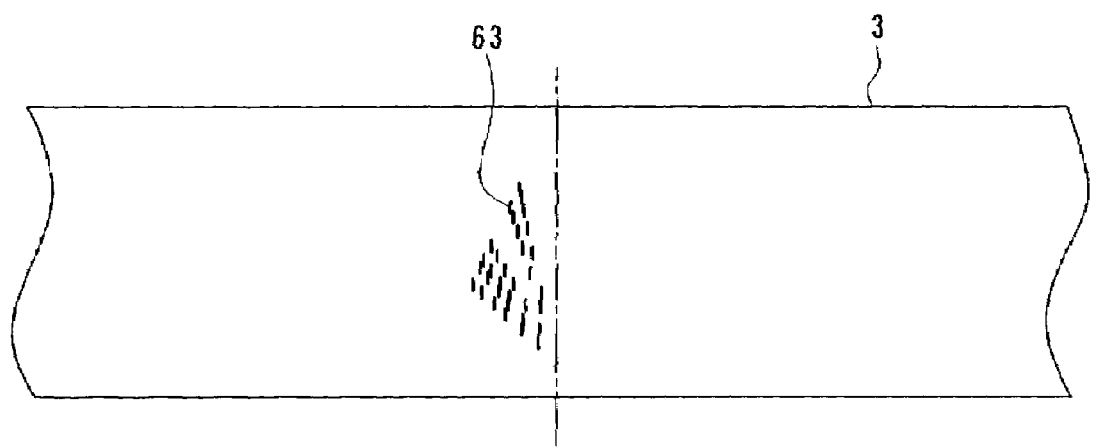
FIG. 7 is an explanatory diagram showing an example of a three-dimensional distribution pattern of magnetization to be formed in an information recording layer in the first embodiment of the invention.

FIG. 7 shows an example of the three-dimensional distribution pattern of magnetization formed in the information recording layer 3. In FIG. 7, minute portions designated by the reference numeral 63 represent the portions (magnetic domains) in which the directions of magnetization are opposite to the initial directions. In FIG. 7, the distribution pattern of magnetization is shown only for a half of the region with respect to the optical axes of the information light 61 and the recording-specific reference light 62.

In this embodiment, by performing recording operation a plurality of times on the same location of the information recording layer 3 with different modulation patterns of the recording-specific reference light 62, it is possible to record information on the same location of the information recording layer 3 on a multiplex basis by phase encoding multiplexing.

In this embodiment, the recording-specific reference light is projected so that it converges to a minimum diameter on the interface between the information recording layer 3 and the protection layer 4 of the optical information recording medium 1. The light is reflected by the reflection film 5 of the optical information recording medium 1 and returns to the objective lens 12. This return light is incident on the four-way split photodetector 29 in the same manner as that under the servo operation. Consequently, in this embodiment, it is possible to perform focus servo using the light incident on the four-way split photodetector 29, even under recording operation.

Next, the function under reproducing operation will be described with reference to FIG. 1, FIG. 8, and FIG. 9. Under reproducing operation, all the pixels of the spatial light modulator 22 are rendered OFF. Besides, the controller 90 supplies the phase-spatial light modulator 16 with information on a modulation pattern axisymmetrical to the modulation pattern of the recording-specific reference light that has been used in recording of the information to be reproduced. According to the information on the modulation pattern supplied from the controller 90, the phase-spatial light modulator 16 spatially modulates the phase of light passing therethrough, thereby generating reproduction-specific reference light having a spatially modulated phase.

The power of the light emitted from the light source unit 20 is set to a low level for reproduction. The controller 90 predicts the timing at which the light that has exited from the objective lens 12 passes through the data areas 7 based on the basic clock reproduced from the reproduction signal RF, and maintains the foregoing setting while the light from the objective lens 12 passes through the data areas 7. While the light from the objective lens 12 passes through the data areas 7, neither focus servo nor tracking servo is performed and the objective lens 12 is fixed.

The light emitted from the light source unit 20 is collimated by the collimator lens 19 and then incident on the beam splitter 18. The light transmitted through the semi-reflecting surface 18a of the beam splitter 18 is incident on the beam splitter 17. The semi-reflecting surface 17a transmits a part of the light in terms of light quantity, and reflects the other part of the light. The light transmitted through the semi-reflecting surface 17a is received by the photodetector 25. The light reflected by the semi-reflecting surface 17a passes through the phase-spatial light modulator 16. In this case, the reflected light is spatially modulated in phase according to the predetermined modulation pattern and becomes the reproduction-specific reference light. Part of the reproduction-specific reference light in terms of light quantity is transmitted through the semi-reflecting surface 15a of the beam splitter 15 and the semi-reflecting surface 14a of the beam splitter 14 in succession, condensed by the objective lens 12, and projected onto the optical information recording medium 1 so that it converges on the interface between the information recording layer 3 and the protection layer 4 of the optical information recording medium 1.

Figure 8:
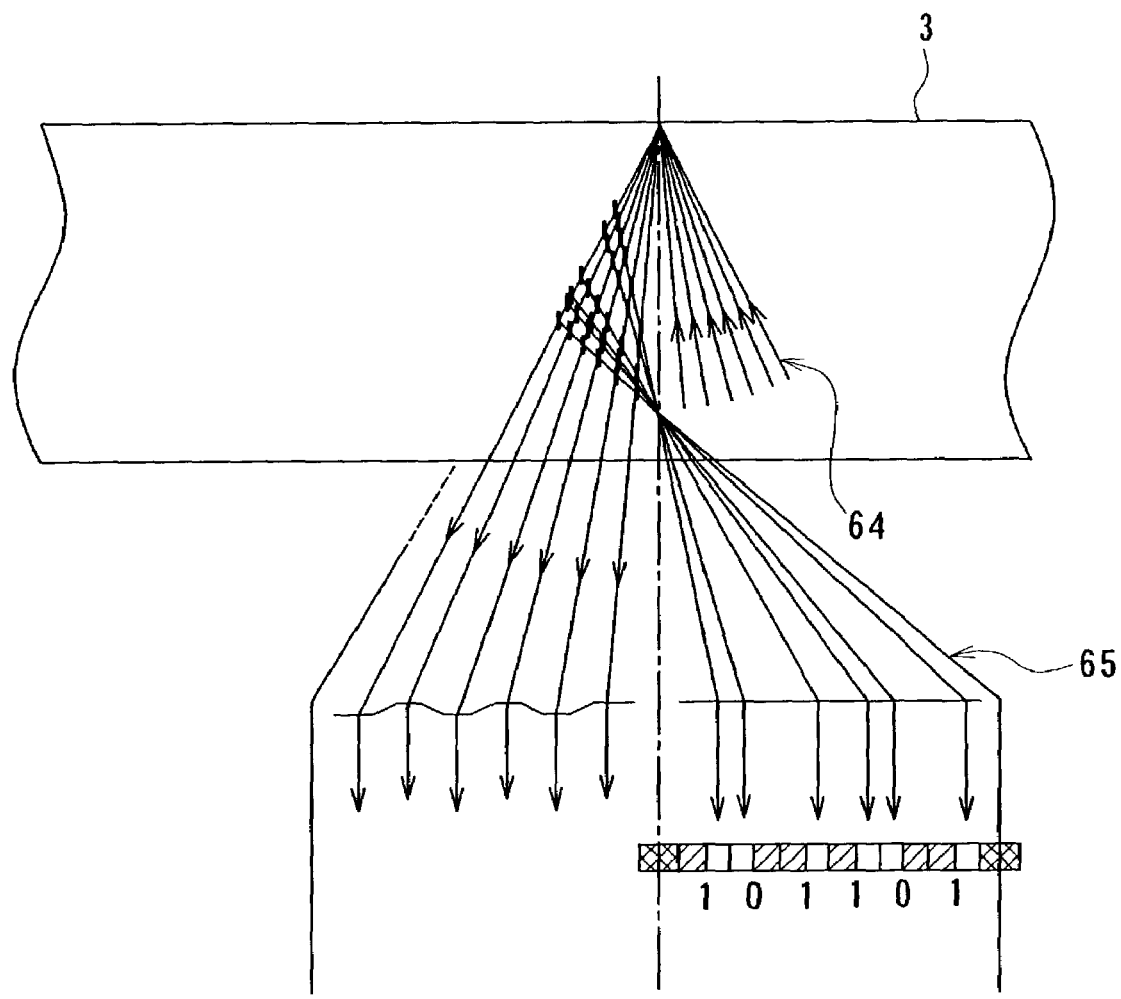
FIG. 8 is an explanatory diagram showing the state of light under reproduction according to the first embodiment of the present invention.

FIG. 8 is an explanatory diagram showing the state of light in the vicinity of the information recording layer 3 under reproducing operation. As shown in FIG. 8, the reproduction-specific reference light 64 having passed through the information recording layer 3 is reflected by the reflection film 5 (not shown in FIG. 8), and again passes through the information recording layer 3. At this time, the modulation pattern of the reproduction-specific reference light 64 is the same as the modulation pattern of the recording-specific reference light 62. As a result, the information recording layer 3 generates reproduction light 65 corresponding to the information light 61 for recording. The reproduction light 65 passes through the objective lens 12 and is incident on the polarization beam splitter 14. Here, given that the reproduction-specific reference light 64 is P-polarized, the reproduction light 65 is S-polarized. Accordingly, the reproduction-specific reference light 64 is reflected by the polarization beam splitter surface 14a of the polarization beam splitter 14 and incident on the CCD array 26, to be detected by the CCD array 26. On the CCD array 26 is formed an image of the ON-OFF pattern caused by the spatial light modulator 22 under the recording operation. This pattern is detected to reproduce the information.

If a plurality of pieces of information are multiplexed and recorded on the information recording layer 3 with different modulation patterns of the recording-specific reference light, only a piece of information corresponding to the recording-specific reference light of a modulation pattern that corresponds to the modulation pattern of the reproduction-specific reference light is reproduced out of the plurality of pieces of information.

As shown in FIG. 8, in this embodiment, irradiation with the reproduction-specific reference light 64 and collection of the reproduction light 65 are performed on the same side of the information recording layer 3 so that the optical axis of the reproduction-specific reference light 64 and the optical axis of the reproduction light 65 are located on the same line.

In this embodiment, the reproduction-specific reference light is projected so that it converges to a minimum diameter on the interface between the information recording layer 3 and the protection layer 4 of the optical information recording medium 1. The light is then reflected by the reflection film 5 of the optical information recording medium 1 and returns to the objective lens 12. This return light is incident on the four-way split photodetector 29 in the same manner as that under the servo operation. Thus, in this embodiment, it is possible to perform focus servo using the light incident on the four-way split photodetector 29, even under reproducing operation.

Figure 9:
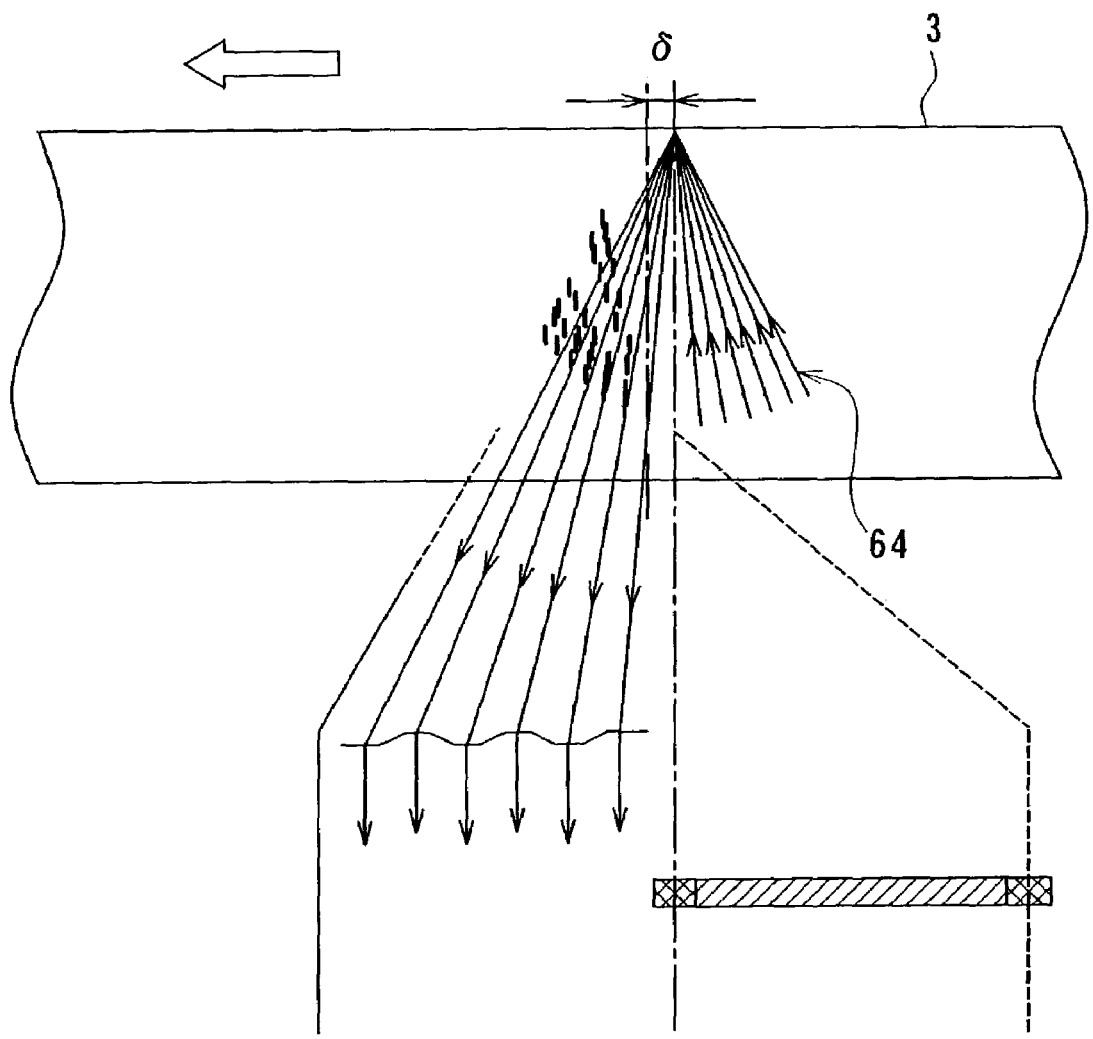
FIG. 9 is an explanatory diagram showing a state where the optical axis of reproduction-specific reference light and the central position of the distribution pattern of magnetization recorded on the information recording layer deviate from each other in the first embodiment of the invention.

FIG. 9 shows a state where the optical axis of the reproduction-specific reference light 64 and the central position of a distribution pattern of magnetization recorded on the information recording layer 3 deviate by δ from each other due to the rotation of the optical information recording medium 1. When the optical axis of the reproduction-specific reference light 64 and the central position of the distribution pattern of magnetization recorded on the information recording layer 3 thus deviate from each other, diffraction light or reproduction light is hardly generated by irradiating the distribution pattern of magnetization with the reproduction-specific reference light 64.

Figure 10:
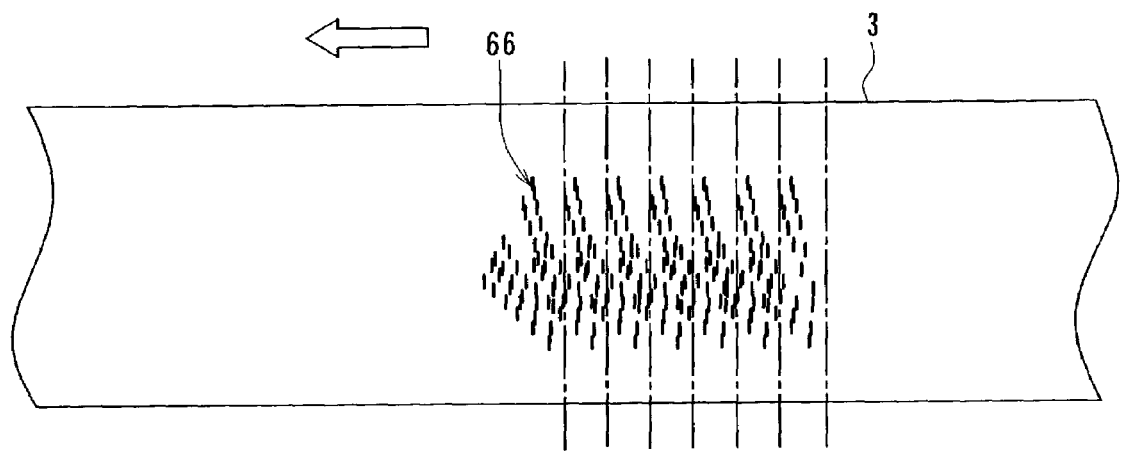
FIG. 10 is an explanatory diagram showing distribution patterns of magnetization for situations where recording has been performed while shifting the central positions of the distribution patterns of magnetization little by little in the first embodiment of the invention.

Hence, as shown in FIG. 10, even if the information has been recorded on the information recording layer 3 with a central position of the distribution patterns of magnetization 66 shifted little by little so that adjoining patterns 66 overlap each other, it is possible to reproduce the information for each of the patterns 66.

Next, the function under erasing operation will be described. Under erasing operation, first, the optical information recording/reproducing apparatus 10 is brought into the state under reproducing operation. Then, reproduction light corresponding to the information to be erased is detected by the CCD array 26, and the information is reproduced based on the reproduction light. The information thus reproduced is sent from the signal processing circuit 89 to the controller 90. Next, the controller 90 brings the optical information recording/reproducing apparatus 10 into the state under recording operation, and supplies the phase-spatial light modulator 16 with information on a distribution pattern corresponding to the information to be erased, so that recording-specific reference light corresponding to the information to be erased is generated. The controller 90 also controls the spatial light modulator 22 based on the reproduced information, i.e., on the information to be erased, so as to generate erasure-specific information light that carries the information to be erased. The controller 90 also controls the electromagnetic coil 30 so that the electromagnetic coil 30 produces a magnetic field in the direction opposite to that under the ordinary recording operation.

Under erasing operation, the recording-specific reference light and the erasure-specific information light are projected onto the information recording layer 3 of the optical information recording medium 1 at a location where the information to be erased is recorded. In addition, the magnetic field in the direction opposite to that under the ordinary recording operation is applied to that location. Consequently, in the distribution pattern of magnetization corresponding to the information to be erased in the information recording layer 3, the portions (magnetic domains) whose directions of magnetization are opposite to the original directions are inverted in the direction of magnetization back to the original directions. In this way, the distribution pattern of magnetization corresponding to the information to be erased disappears, and the information to be erased is thereby erased.

According to the erasing method of this embodiment, only the distribution pattern of magnetization corresponding to the information to be erased can be eliminated selectively. It is thus possible to erase part of information selectively even if the information is recorded on a multiplex basis. In addition, another information can be recorded on the portions of the information recording layer 3 where previous information has been erased.

Now, description will be given of the configuration of the information recording layer 3 of the optical information recording medium 1 according to this embodiment. The information recording layer 3 may be made of a typical magneto-optic recording material such as a TbFeCo-based amorphous film. Besides, it is also possible to use a granular film, a magnetic film formed by laminating magnetic particles prepared by mist pyrolysis, a magnetic film having pinning sites, or a magnetic photonic crystal as will be described below.

Figure 11:
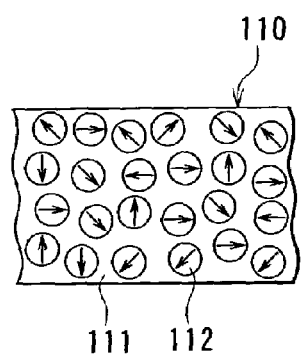
FIG. 11 is an explanatory diagram schematically showing the constitution of a granular film.

FIG. 11 is an explanatory diagram schematically showing the constitution of a granular film. A granular film 110 has a structure in which magnetic particles 112 are dispersed in a film 111 of a nonmagnetic substance. The use of the granular film 110 as the information recording layer 3 allows changes of magnetization in finer units, so that it becomes possible to form finer three-dimensional distribution patterns of magnetization in the information recording layer 3.

The following provides an example of a method of forming a particularly preferable granular film. In the example, an FeNi (e.g., Fe: 20 wt %, Ni: 80 wt %) film is formed on a substrate by sputtering from an oblique direction (e.g., a direction at 60° relative to the substrate), and this FeNi film is used as a base film. On this base film, a granular film of, for example, Co—Sm—O type is formed. It is known that FeNi base films formed by sputtering in an oblique direction form a ribbed structure in the direction perpendicular to a sputter beam. Hence, when the granular film is formed on this base film, the granular film is formed in the grooves of the ribbed structure. Such a structure allows the granular film to be soft magnetic due to leakage flux acting on between the narrow gaps in the FeNi base film of ribbed structure. As a result, it is possible to achieve a granular film that has high magnetic field sensitivity.

Figure 12:
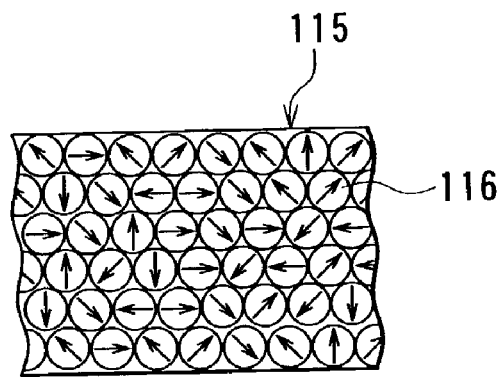
FIG. 12 is an explanatory diagram schematically showing the constitution of a magnetic film that is formed by laminating magnetic particles prepared by mist pyrolysis.

FIG. 12 is an explanatory diagram schematically showing the constitution of a magnetic film that is formed by laminating magnetic particles prepared by mist pyrolysis. This magnetic film 115 is formed by laminating magnetic particles 116 that are prepared by mist pyrolysis. The mist pyrolysis, as described in the literature 'Hara, Chie, et al. "Direct synthesis of yttrium-iron garnet by mist pyrolysis," the abstracts of the 21st academic lectures (1997), Magnetic Society of Japan, p.460' is a method of preparing particles by subjecting an ultrasonic nebulized mist to pyrolysis in an electric furnace or the like. When the magnetic film 115 formed by laminating magnetic particles prepared by mist pyrolysis is used as the information recording layer 3, magnetization can be changed in finer units, so that it becomes possible to form finer three-dimensional distribution patterns of magnetization in the information recording layer 3.

Figure 13:
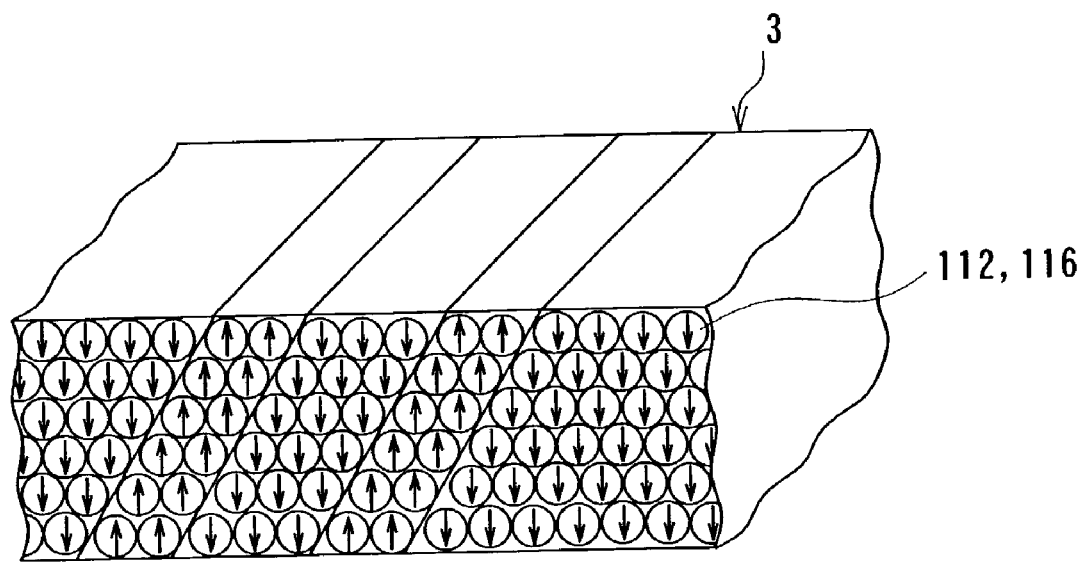
FIG. 13 is an explanatory diagram showing an example of a three-dimensional distribution pattern of magnetization in an information recording layer made of a granular film or a magnetic film that is formed by laminating magnetic particles prepared by mist pyrolysis.

FIG. 13 is an explanatory diagram showing an example of the three-dimensional distribution pattern of magnetization in an information recording layer 3 made of the granular film 110 or the magnetic film 115 that is formed by laminating magnetic particles prepared by mist pyrolysis. In the information recording layer 3 shown in FIG. 13, the direction of magnetization can be changed for each of the magnetic particles 112 or the magnetic particles 116. This makes it possible to form finer three-dimensional distribution patterns of magnetization in the information recording layer 3.

Figure 14:
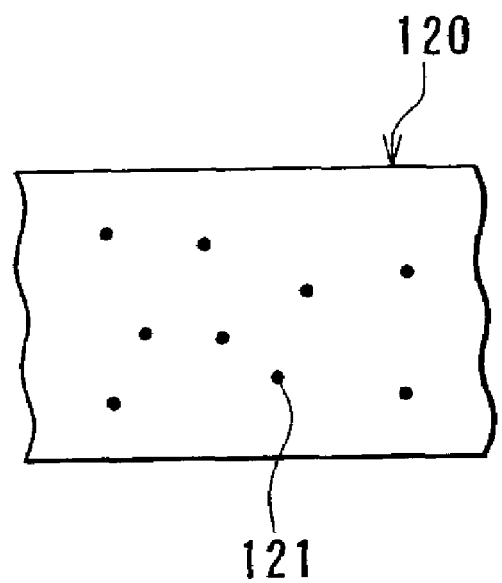
FIG. 14 is an explanatory diagram schematically showing the constitution of a magnetic film having pinning sites.

FIG. 14 is an explanatory diagram schematically showing the constitution of a magnetic film having pinning sites. This magnetic film 120 has pinning sites 121. The pinning sites 121 are portions for restraining (pinning) the movements of domain walls, and are formed of crystalline grain boundaries, pores, flaws, or the like. The use of the magnetic film 120 having pinning sites as the information recording layer 3 allows changes of magnetization in finer units, so that it becomes possible to form finer three-dimensional distribution patterns of magnetization in the information recording layer 3.

Figure 15:
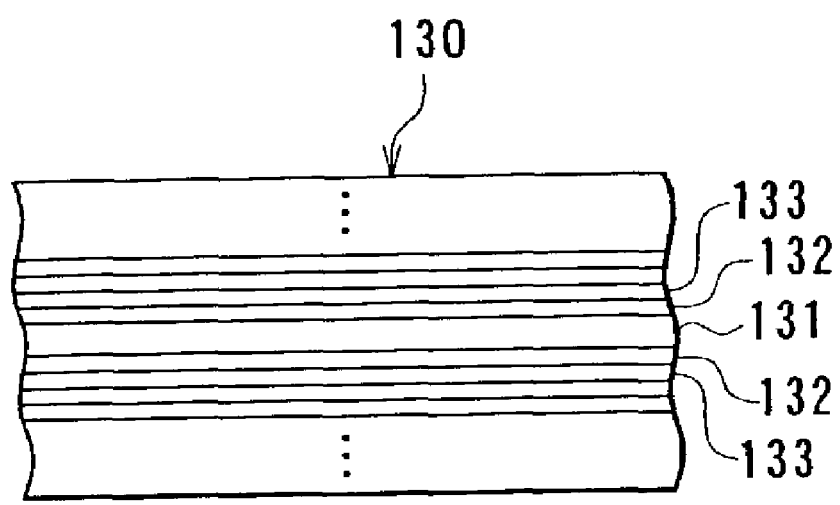
FIG. 15 is an explanatory diagram schematically showing the constitution of a magnetic photonic crystal.

FIG. 15 is an explanatory diagram schematically showing the constitution of a magnetic photonic crystal. In FIG. 15, the constitution is shown of a one-dimensional magnetic photonic crystal 130 in particular. This one-dimensional magnetic photonic crystal 130 has a structure in which dielectric multilayer films are formed on both sides of a magnetic substance layer 131. Rare-earth iron garnet, bismuth-substituted rare-earth iron garnet or the like is used as the material of the magnetic substance layer 131. The dielectric multilayer films are made by laminating $SiO_2$ films 132 and $Ta_2O_5$ films 133 alternately, for example. The layer structure of the one-dimensional magnetic photonic crystal 130 has a cycle on the order of the wavelengths of the light in use. The use of the magnetic photonic crystal 130 as the information recording layer 3 allows to achieve greater Faraday rotation angles, and as a result, it becomes possible to increase reproduction output.

Figure 16:
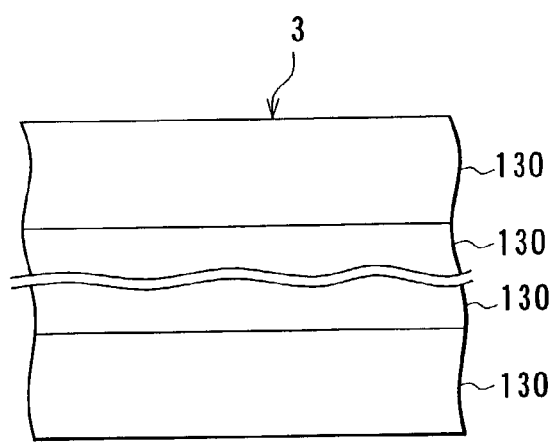
FIG. 16 is an explanatory diagram showing an information recording layer that is formed by laminating a plurality of layers of magnetic photonic crystal.

Here, the structure composed of the magnetic substance layer 131 and the dielectric multilayer films formed on both sides thereof as shown in FIG. 15 shall be referred to as a single-layer magnetic photonic crystal. The information recording layer 3 may be made of a single-layer magnetic photonic crystal 130, or may be made by laminating a plurality of the single-layer magnetic photonic crystals 130 as shown in FIG. 16.

As has been described so far, according to the optical information recording/reproducing apparatus 10 of this embodiment, a three-dimensional distribution pattern of magnetization corresponding to a three-dimensional interference pattern resulting from the interference between the information light and the recording-specific reference light is formed in the information recording layer 3 of the optical information recording medium 1 to thereby record information. It is thus possible to record information on the optical information recording medium 1 in the form of a three-dimensional interference pattern through the use of holography. In addition, the distribution pattern of magnetization formed in the information recording layer 3 is easily changeable. Hence, according to the embodiment, it is possible to record information on the information recording layer 3 so that the information is erasable in part.

Furthermore, according to the optical information recording/reproducing apparatus 10 of this embodiment, reproduction light that carries the information recorded is obtained by irradiating the distribution pattern of magnetization formed in the information recording layer 3 with the reproduction-specific reference light, and the information can be reproduced by detecting the reproduction light. In addition, according to the embodiment, the direction of polarization of the reproduction light is orthogonal to the direction of polarization of the reproduction-specific reference light. It is therefore easy to separate the reproduction light and the reproduction-specific reference light from each other by using the polarization beam splitter 14, and the SN ratio (signal-to-noise ratio) of the reproduction signal is thereby improved.

Besides, according to the optical information recording/reproducing apparatus 10 of this embodiment, only the distribution pattern of magnetization corresponding to the information to be erased can be selectively eliminated from the information recording layer 3. It is thus possible to erase part of information selectively even if the information is recorded on a multiplex basis.

In addition, according to the optical information recording medium 1 of this embodiment, it is possible to record information in the form of a three-dimensional interference pattern through the use of holography so that the information is erasable in part.

Moreover, according to this embodiment, it is possible to record information on a multiplex basis on the optical information recording medium 1 by phase encoding multiplexing.

Furthermore, according to this embodiment, the irradiation of the optical information recording medium 1 with the recording-specific reference light and the information light for recording, and the irradiation of the optical information recording medium 1 with the reproduction-specific reference light and the collection of the reproduction light for reproduction are all performed from the same side and on the same axis on the optical information recording medium 1. This allows a compact configuration of the optical system for recording and reproduction. In addition, according to this embodiment, the optical system for recording and reproduction can be configured in the form of the pick-up 11 as with ordinary optical disk devices. Consequently, random access to the optical information recording medium 1 can be made easily.

Additionally, according to this embodiment, information for performing focus servo and tracking servo is recorded on the optical information recording medium 1 so that this information can be used to perform focus servo and tracking servo. This allows a precise positioning of the light for recording or reproduction, which consequently improves removability, facilitates random access, and increases recording density, recording capacity and transfer rate. In particular, the embodiment dramatically increases recording density, recording capacity and transfer rate as a result of combination with the capability of recording information on a multiplex basis by phase-encoding multiplexing. For example, a series of pieces of information may be multiplexed and recorded on one location in the information recording layer 3 using different modulation patterns of the recording-specific reference light. In this case, recording and reproduction of the information is feasible at extremely high speed.

Additionally, this embodiment facilitates copy protection and security protection because information recorded on the optical information recording medium 1 cannot be reproduced without using the reproduction-specific reference light of the same modulation patterns as the modulation patterns of the recording-specific reference light that has been used for recording the information. Further, according to the embodiment, a number of types of information (for example, various types of software) can be recorded on the optical information recording medium 1 with reference light of different modulation patterns, so as to realize such service that the optical information recording medium 1 itself is offered to users at a relatively low price and the information on the modulation patterns of the reference light for allowing reproduction of the respective types of information is individually provided as key information at cost by request.

Besides, according to the optical information recording/reproducing apparatus 10 of this embodiment, information recorded in the form of emboss pits on a recording medium can be reproduced by bringing the pick-up 11 into a servo state. This allows the apparatus 10 to be compatible with conventional optical disk devices.

In addition, according to the optical information recording/reproducing apparatus 10 of this embodiment, individual pieces of information to be recorded on a multiplex basis on the optical information recording medium 1 are associated with different modulation patterns of the phase of reference light. Therefore, it is extremely difficult to duplicate the optical information recording medium 1 on which information is recorded. This can preclude unauthorized duplication.

Moreover, in the optical information recording medium 1 according to this embodiment, the information recording layer 3 for information to be recorded on through the use of holography and the layer for such information as addresses to be recorded on in the form of emboss pits are separated from each other. Therefore, if one intends to duplicate the optical information recording medium 1 on which information is recorded, he must associate those two layers with each other. This also makes duplication difficult and can preclude unauthorized duplication.

Furthermore, in the optical information recording medium 1 of this embodiment, the reflection film 5 may be made of a dielectric multilayer film which restrains the reflected light from becoming elliptically polarized light when linearly polarized light is incident thereon. In this case, it is possible to improve the S/N ratio in reproducing information.

SECOND EMBODIMENT

Figure 17:
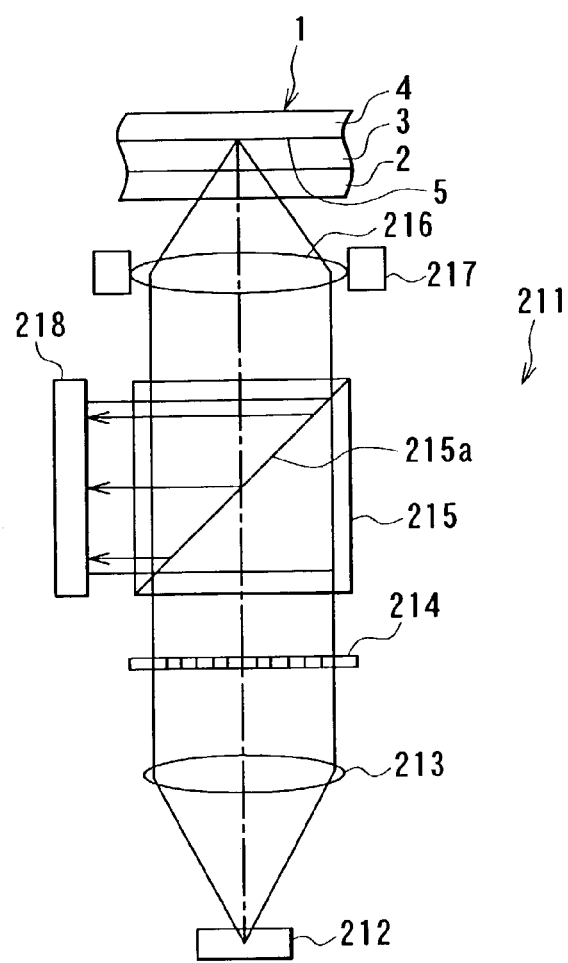
FIG. 17 is an explanatory diagram showing a configuration of a pick-up of an optical information recording/reproducing apparatus according to a second embodiment of the invention.

Reference is now made to FIG. 17 to describe a second embodiment of the invention. FIG. 17 is an explanatory diagram showing a configuration of a pick-up in an optical information recording/reproducing apparatus according to this embodiment. The pick-up 211 of this embodiment comprises a light emitting/receiving device 212, and a collimator lens 213, a spatial light modulator 214, a polarization beam splitter 215 and an objective lens 216 arranged in this order from the light emitting/receiving device 212, between the light emitting/receiving device 212 and the optical information recording medium 1. The pick-up 211 further comprises an actuator 217 that is capable of moving the objective lens 216 in the directions of the thickness and the radius of the optical information recording medium 1.

The light emitting/receiving device 212 includes: a light source unit for emitting laser light; and an optical system and photodetectors for detecting a focus error signal FE, a tracking error signal TE, and a reproduction signal RF out of return light from the optical information recording medium 1.

The polarization beam splitter 215 has a polarization beam splitter surface 215a. The normal direction of the polarization beam splitter surface 215a is inclined at 45° with respect to the direction of the optical axis of the objective lens 216.

The pick-up 211 further includes a CCD array 218 that is provided in the direction in which the return light from the optical information recording medium 1 is reflected by the polarization beam splitter surface 215a of the polarization beam splitter 215.

The optical information recording/reproducing apparatus of this embodiment is otherwise configured the same as the first embodiment. The spatial light modulator 214, the actuator 217, and the CCD array 218 of this embodiment correspond to the spatial light modulator 16, the actuator 13, and the CCD array 26 of the first embodiment, respectively.

Next, description will be given of the functions of the optical information recording/reproducing apparatus of this embodiment under servo, recording, reproducing, and erasing operations, individually.

First, the function under servo operation will be described. Under servo operation, all the pixels of the spatial light modulator 214 are rendered ON. The power of light emitted from the light emitting/receiving device 212 is set to a low level for reproduction.

The light emitted from the light emitting/receiving device 212 is collimated by the collimator lens 213, and passes through the spatial light modulator 214. The light is then transmitted through the polarization beam splitter surface 215a of the polarization beam splitter 215, condensed by the objective lens 216, and projected onto the optical information recording medium 1 so that it converges on the interface between the information recording layer 3 and the protection layer 4 of the optical information recording medium 1. This light is reflected by the reflection film 5 of the optical information recording medium 1. In this case, the reflected light is modulated by the emboss pits in the address servo areas, and then returns to the objective lens 216.

The return light from the optical information recording medium 1 is collimated by the objective lens 216, and transmitted through the polarization beam splitter surface 215a of the polarization beam splitter 215. The light then passes through the spatial light modulator 214, is condensed by the collimator lens 213, and detected by the photodetector of the light emitting/receiving device 212. Based on the output of the photodetector, the focus error signal FE, the tracking error signal TE, and the reproduction signal RF are generated. Based on these signals, focus servo and tracking servo are performed, along with reproduction of the basic clock and the determination of addresses.

Next, the function under recording operation will be described. The spatial light modulator 214 spatially modulates the light passing therethrough by selecting ON or OFF pixel by pixel according to the information to be recorded. The light modulated by the spatial light modulator 214 is transmitted through the polarization beam splitter surface 215a of the polarization beam splitter 215, condensed by the objective lens 216, and projected onto the optical information recording medium 1 so that it converges on the interface between the information recording layer 3 and the protection layer 4 of the optical information recording medium 1. In addition, an electromagnetic coil that is not shown applies to the information recording layer 3 of the optical information recording medium 1 an external magnetic field in the direction opposite to the initial direction of magnetization of the information recording layer 3.

In this embodiment, the light modulated by the spatial light modulator 214 has functions of both the information light and the recording-specific reference light. That is, when projected onto the information recording medium 1, the light modulated by the spatial light modulator 214 passes through the information recording layer 3, is reflected by the reflection film 5, and then passes through the information recording layer 3 again. Here, the light that initially passes through the information recording layer 3 and the light that passes through the information recording layer 3 after being reflected by the reflection film 5 interfere with each other to form a three-dimensional interference pattern. Consequently, one of these two kinds of light serves as the information light and the other as the recording-specific reference light.

Next, the function under reproducing operation will be described. All the pixels of the spatial light modulator 214 are rendered ON in order to generate reproduction-specific reference light. Otherwise, in order to make the spatial frequency of the reproduction-specific reference light generally equal to the spatial frequency of the recording-specific reference light, the spatial light modulator 214 may be switched ON/OFF alternately pixel by pixel to generate reproduction-specific reference light that is spatially modulated in a checkered pattern.

The reproduction-specific reference light is transmitted through the polarization beam splitter surface 215a of the polarization beam splitter 215, condensed by the objective lens 216, and projected onto the optical information recording medium 1 so that it converges on the interface between the information recording layer 3 and the protection layer 4 of the optical information recording medium 1. The reproduction-specific reference light passes through the information recording layer 3, is reflected by the reflection film 5, and passes through the information recording layer 3 again.

Here, the reproduction-specific reference light that first passes through the information recording layer 3 causes reproduction light that proceeds toward the objective lens 216 from the information recording layer 3. On the other hand, the reproduction-specific reference light that passes through the information recording layer 3 after being reflected by the reflection film 5 causes reproduction light that proceeds toward the reflection film 5 from the information recording layer 3. This reproduction light is reflected by the reflection film 5 and proceeds toward the objective lens 216.

The reproduction light is collimated by the objective lens 216, reflected by the polarization beam splitter surface 215a of the polarization beam splitter 215, and detected by the CCD array 218.

Next, description will be given of the function under erasing operation. Under erasing operation, as in the first embodiment, the information to be erased is reproduced to generate erasure-specific information light that carries the information to be erased. The erasure-specific information light is projected onto the information recording layer 3 of the optical information recording medium 1, and a magnetic field in the direction opposite to that under the ordinary recording operation is applied to the information recording layer 3 by the electromagnetic coil.

In this embodiment, under the recording operation, a half area of the spatial light modulator 214 may be used to generate the information light while the other half area may be used to generate the recording-specific reference light.

The remainder of the configuration, functions, and effects of this embodiment are the same as those of the first embodiment.

The present invention is not limited to the foregoing embodiments, and various modifications may be made thereto. For example, the device for detecting information recorded on the information recording layer 3 may be a smart light sensor in which MOS type solid image pick-up devices and a signal processing circuit are integrated on a single chip (for example, see the literature "O plus E, September 1996, No. 202, pp. 93-99"), instead of the CCD array. Since this smart light sensor has a high transfer rate and high-speed operation facilities, the use of this smart light sensor allows high-speed reproduction. For example, reproduction can be performed at transfer rates on the order of Gbit/s.

Besides, when a smart light sensor is used as the device for detecting the information recorded on the information recording layer 3 in particular, address information and the like need not be recorded on the address servo areas 6 of the optical information recording medium 1 in the form of emboss pits. Instead, a predetermined pattern of address information or the like may be recorded in advance by the same method as with the holography-based recording on the data areas 7 so that the address information or the like be detected by the smart light sensor with the pick-up under servo operation rendered in the same state as under reproducing operation. In this case, the basic clock and addresses can be obtained directly from the detection data of the smart light sensor. The tracking error signal can be obtained from the position information of the reproduction pattern on the smart light sensor. In addition, focus servo can be performed by driving the objective lens so that the reproduction pattern on the smart light sensor becomes maximum in contrast. Besides, under reproducing operation, focus servo can also be performed by driving the objective lens so that the reproduction pattern on the smart light sensor becomes maximum in contrast.

Furthermore, in each of the embodiments, information on the modulation patterns and on the wavelengths of reference light may be supplied to the controller 90 from an external host apparatus.

As has been described, according to the optical information recording apparatus of the invention, information is recorded by forming a three-dimensional distribution pattern of magnetization corresponding to a three-dimensional interference pattern resulting from the interference between information light and recording-specific reference light in the information recording layer of the optical information recording medium. It is thus possible to record information on the optical information recording medium in the form of a three-dimensional interference pattern so that the information is erasable in part.

In the optical information recording apparatus of the invention, the recording optical system may be designed to perform the irradiation with the information light and the recording-specific reference light so that the optical axis of the information light and the optical axis of the recording-specific reference light are located on the same line. In this case, it is possible to configure the optical system for recording to be compact.

The optical information recording apparatus of the invention may include the position control means for controlling the positions of the information light and the recording-specific reference light with respect to the optical information recording medium by using the information recorded on the positioning areas of the optical information recording medium. In this case, positioning of the light for recording can be done with high precision.

On the other hand, according to the optical information reproducing apparatus of the invention, it is possible to reproduce information that is recorded on the optical information recording medium in the form of a three-dimensional interference pattern so that the information is erasable in part.

In the optical information reproducing apparatus of the invention, the reproducing optical system may be designed to perform the irradiation with the reproduction-specific reference light and the collection of the reproduction light so that the optical axis of the reproduction-specific reference light and the optical axis of the reproduction light are located on the same line. In this case, it is possible to configure the optical system for reproduction to be compact.

The optical information reproducing apparatus of the invention may include the position control means for controlling the position of the reproduction-specific reference light by using the information recorded on the positioning areas of the optical information recording medium. In this case, positioning of the light for reproduction can be done with high precision.

On the other hand, according to the optical information recording/reproducing apparatus of the invention, it is possible to record information on the optical information recording medium in the form of a three-dimensional interference pattern so that the information is erasable in part, and to reproduce the information.

In the optical information recording/reproducing apparatus of the invention, the recording/reproducing optical system may be designed to perform the irradiation with the information light and the recording-specific reference light so that the optical axis of the information light and the optical axis of the recording-specific reference light are located on the same line, and to perform the irradiation with the reproduction-specific reference light and the collection of the reproduction light so that the optical axis of the reproduction-specific reference light and the optical axis of the reproduction light are located on the same line. In this case, it is possible to configure the optical system for recording and reproduction to be compact.

The optical information recording/reproducing apparatus of the invention may include the position control means for controlling the positions of the information light, the recording-specific reference light and the reproduction-specific reference light with respect to the optical information recording medium by using the information recorded on the positioning areas of the optical information recording medium. In this case, positioning of the light for recording and of the light for reproduction can be done with high precision.

The optical information recording/reproducing apparatus of the invention may include the erasure means for erasing information by reproducing the information to be erased, generating the erasure-specific information light that carries the information reproduced, irradiating the information recording layer with the erasure-specific information light and the recording-specific reference light, and by applying to the information recording layer a magnetic field in a direction opposite to that for recording. In this case, it is possible to erase the information recorded on the information recording layer selectively in part.

On the other hand, the optical information recording medium of the invention comprises the information recording layer made of a magneto-optic recording material, on which information is recorded in the form of a distribution pattern of magnetization, the distribution pattern of magnetization changing according to an interference pattern resulting from the interference between the information light and the recording-specific reference light and a magnetic field applied thereto. It is therefore possible to record information in the form of a three-dimensional interference pattern so that the information is erasable in part.

The optical information recording medium of the invention may have the positioning areas on which the information for positioning incident light is recorded. In this case, positioning of the incident light can be done with high precision.

In the optical information recording medium of the invention, the information recording layer may be made of a granular film. In this case, magnetization can be changed in finer units, which allows formation of finer distribution patterns of magnetization in the information recording layer.

In the optical information recording medium of the invention, the information recording layer may be made of a magnetic film formed by laminating magnetic particles prepared by mist pyrolysis. In this case, magnetization can be changed in finer units, which allows formation of finer distribution patterns of magnetization in the information recording layer.

In the optical information recording medium of the invention, the information recording layer may be made of a magnetic film having pinning sites. In this case, magnetization can be changed in finer units, which allows formation of finer distribution patterns of magnetization in the information recording layer.

In the optical information recording medium of the invention, the information recording layer may be made of a magnetic photonic crystal. In this case, it becomes possible to enhance the reproduction output.

In the optical information recording medium of the invention, the reflection film provided on the side of the information recording layer opposite to the light-incidence side may be made of a dielectric multilayer film which restrains the reflected light from becoming elliptically polarized light when linearly polarized light is incident thereon. In this case, it is possible to improve the S/N ratio in reproducing information.

It is apparent from the foregoing description that the invention may be carried out in various modes and may be modified in various ways. It is therefore to be understood that within the scope of equivalence of the appended claims the invention may be practiced in modes other than the foregoing best modes.

The invention claimed is:

1. An optical information recording apparatus for recording information on an optical information recording medium, the recording medium having an information recording layer made of a magneto-optic recording material, information being recorded in the information recording layer in the form of a three-dimensional distribution pattern of magnetization through the use of holography, the apparatus comprising:

information light generation means for generating information light that carries information;
recording-specific reference light generation means for generating recording-specific reference light;
a recording optical system for irradiating the information recording layer with the information light generated by the information light generation means and the recording-specific reference light generated by the recording-specific reference light generation means, so that a three-dimensional interference pattern resulting from interference between the information light and the recording-specific reference light is formed in the information recording layer; and
magnetic field application means for applying, to the information recording layer, a magnetic field for changing the three-dimensional distribution pattern of magnetization in the information recording layer according to the interference pattern.

2. An optical information recording apparatus according to claim 1, wherein the recording optical system performs the irradiation with the information light and the recording-specific reference light so that an optical axis of the information light and an optical axis of the recording-specific reference light are located on the same line.

3. An optical information recording apparatus according to claim 1, wherein the optical information recording medium has a positioning area on which
information for positioning the information light and the recording-specific reference light is recorded, the apparatus further comprising position control means for controlling positions of the information light and the recording-specific reference light with respect to the optical information recording medium by performing focus servo and tracking servo using he information recorded on the positioning area.

4. An optical information reproducing apparatus for reproducing information front an optical information recording medium, the recording medium having an information recording layer made of a magneto-optic recording material, the information being recorded in the information recording layer in the form of a three-dimensional distribution pattern of magnetization through the use of holography, the apparatus comprising:
reproduction-specific reference light generation means for generating reproduction-specific reference light;
a reproducing optical system for irradiating the information recording layer with the reproduction-specific reference light generated by the reproduction-specific reference light generation means, and for collecting reproduction light generated from the information recording layer irradiated with the reproduction-specific reference light; and
detection means for detecting the reproduction light collected by the reproducing optical system.

5. An optical information reproducing apparatus according to claim 4, wherein the reproducing optical system performs the irradiation with the reproduction-specific reference light and the collection of the reproduction light so that an optical axis of the reproduction-specific reference light and an optical axis of the reproduction light are located on the same line.

6. An optical information reproducing apparatus according to claim 4, wherein the optical information recording medium has a positioning area on which information for positioning the reproduction-specific reference light is recorded, the apparatus further comprising position control means for controlling a position of the reproduction-specific reference light with respect to the optical information recording medium by performing focus servo and tracking servo using the information recorded on the positioning area.

7. An optical information recording/reproducing apparatus for recording information on an optical information recording medium and reproducing the information from the optical information recording medium, the recording medium having an information recording layer made of a magneto-optic recording material, the information being recorded in the information recording layer in the form of a three-dimensional distribution pattern of magnetization through the use of holography, the apparatus comprising:

information light generation means for generating information light that carries information;

recording-specific reference light generation means for generating recording-specific reference light;

reproduction-specific reference light generation means for generating reproduction-specific reference light;

a recording/reproducing optical system for irradiating the information recording layer with the information light generated by the information light generation means and the recording-specific reference light generated by the recording-specific reference light generation means so that a three-dimensional interference pattern resulting from interference between the information light and the recording-specific reference light is formed in the information recording layer, and for irradiating the information recording layer with the reproduction-specific reference light generated by the reproduction-specific reference light generation means and collecting reproduction light generated from the information recording layer;

magnetic field application means for applying, to the information recording layer, a magnetic field for changing the three-dimensional distribution pattern of magnetization in the information recording layer according to the interference pattern; and detection means for detecting the reproduction light collected by the recording/reproducing optical system.

8. An optical information recording/reproducing apparatus according to claim 7, wherein the recording/reproducing optical system performs the irradiation with the information light and the recording-specific reference light so that an optical axis of the information light and an optical axis of the recording-specific reference light are located on the same line, and performs the irradiation with the reproduction-specific reference light and the collection of the reproduction light so that an optical axis of the reproduction-specific reference light and an optical axis of the reproduction light are located on the same line.

9. An optical information recording/reproducing apparatus according to claim 7, wherein the optical information recording medium has a positioning area on which information for positioning the information light, the recording-specific reference light and the reproduction-specific reference light is recorded, the apparatus further comprising position control means for controlling positions of the information light, the recording-specific reference light and the reproduction-specific reference light with respect to the optical information recording medium by performing focus servo and tracking servo using the information recorded on the positioning area.

10. An optical information recording/reproducing apparatus according to claim 7, further comprising erasure means for erasing information by making the detection means detect reproduction light corresponding to information to be erased, reproducing the information based on the reproduction light, making the information light generation means generate erasure-specific information light that carries the reproduced information, making the recording-specific reference light generation means generate recording-specific reference light, irradiating the information recording layer with the erasure-specific information light and the recording-specific reference light, and by making the magnetic field application means apply to the information recording layer a magnetic field in a direction opposite to that for recording.

* * * * *